United States Patent
Choi et al.

(10) Patent No.: US 10,492,060 B2
(45) Date of Patent: Nov. 26, 2019

(54) METHOD AND DEVICE FOR TRANSMITTING/RECEIVING DATA IN WIRELESS COMMUNICATION SYSTEM

(71) Applicant: LG ELECTRONICS INC., Seoul (KR)

(72) Inventors: Jingu Choi, Seoul (KR); Hyunhee Park, Seoul (KR); Younghwan Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/744,395

(22) PCT Filed: Jul. 13, 2016

(86) PCT No.: PCT/KR2016/007632
§ 371 (c)(1),
(2) Date: Jan. 12, 2018

(87) PCT Pub. No.: WO2017/010812
PCT Pub. Date: Jan. 19, 2017

(65) Prior Publication Data
US 2018/0213395 A1 Jul. 26, 2018

Related U.S. Application Data

(60) Provisional application No. 62/191,533, filed on Jul. 13, 2015.

(51) Int. Cl.
*H04W 8/24* (2009.01)
*H04W 76/14* (2018.01)
(Continued)

(52) U.S. Cl.
CPC ............. *H04W 8/24* (2013.01); *H04L 67/16* (2013.01); *H04W 52/0216* (2013.01); *H04W 52/0219* (2013.01); *H04W 76/14* (2018.02); *H04W 4/80* (2018.02); *H04W 8/005* (2013.01); *H04W 48/16* (2013.01); *H04W 60/00* (2013.01);
(Continued)

(58) Field of Classification Search
None
See application file for complete search history.

(56) References Cited

U.S. PATENT DOCUMENTS

2012/0030358 A1* 2/2012 MacKenzie ............. H04W 4/70 709/226
2017/0038847 A1* 2/2017 Schorsch ................ G06F 3/017

FOREIGN PATENT DOCUMENTS

WO  WO 2012/057407 A1  5/2012
WO  WO 2013/036092 A2  3/2013
(Continued)

*Primary Examiner* — Chirag G Shah
*Assistant Examiner* — Srinivasa R Reddivalam
(74) *Attorney, Agent, or Firm* — Birch, Stewart, Kolasch & Birch, LLP

(57) ABSTRACT

The present invention relates to a method and device for a sever device to transmit and receive data with a client device in a wireless communication system. According to the present invention, a method and device are provided which: store device information showing a client device on a list and register the client device; update the status of the client device from the client device; and transmit first status information showing the updated status to a user device.

13 Claims, 25 Drawing Sheets

(51) Int. Cl.
     *H04L 29/08*     (2006.01)
     *H04W 52/02*    (2009.01)
     *H04W 4/80*     (2018.01)
     *H04W 8/00*     (2009.01)
     *H04W 60/00*    (2009.01)
     *H04W 84/18*    (2009.01)
     *H04W 48/16*    (2009.01)

(52) U.S. Cl.
     CPC ............ *H04W 84/18* (2013.01); *Y02D 70/00* (2018.01); *Y02D 70/142* (2018.01); *Y02D 70/144* (2018.01); *Y02D 70/22* (2018.01); *Y02D 70/26* (2018.01)

(56) References Cited

FOREIGN PATENT DOCUMENTS

| | | | | |
|---|---|---|---|---|
| WO | WO 2014/092513 A1 | 6/2014 | | |
| WO | WO 2014/098477 A1 | 6/2014 | | |
| WO | WO-2014092513 A1 * | 6/2014 | ....... | G06F 17/30575 |
| WO | WO-2014098477 A1 * | 6/2014 | ............ | G08C 17/02 |
| WO | WO 2014/193166 A1 | 12/2014 | | |
| WO | WO-2014193166 A1 * | 12/2014 | ............ | H04L 67/02 |

\* cited by examiner

Data channel PDU

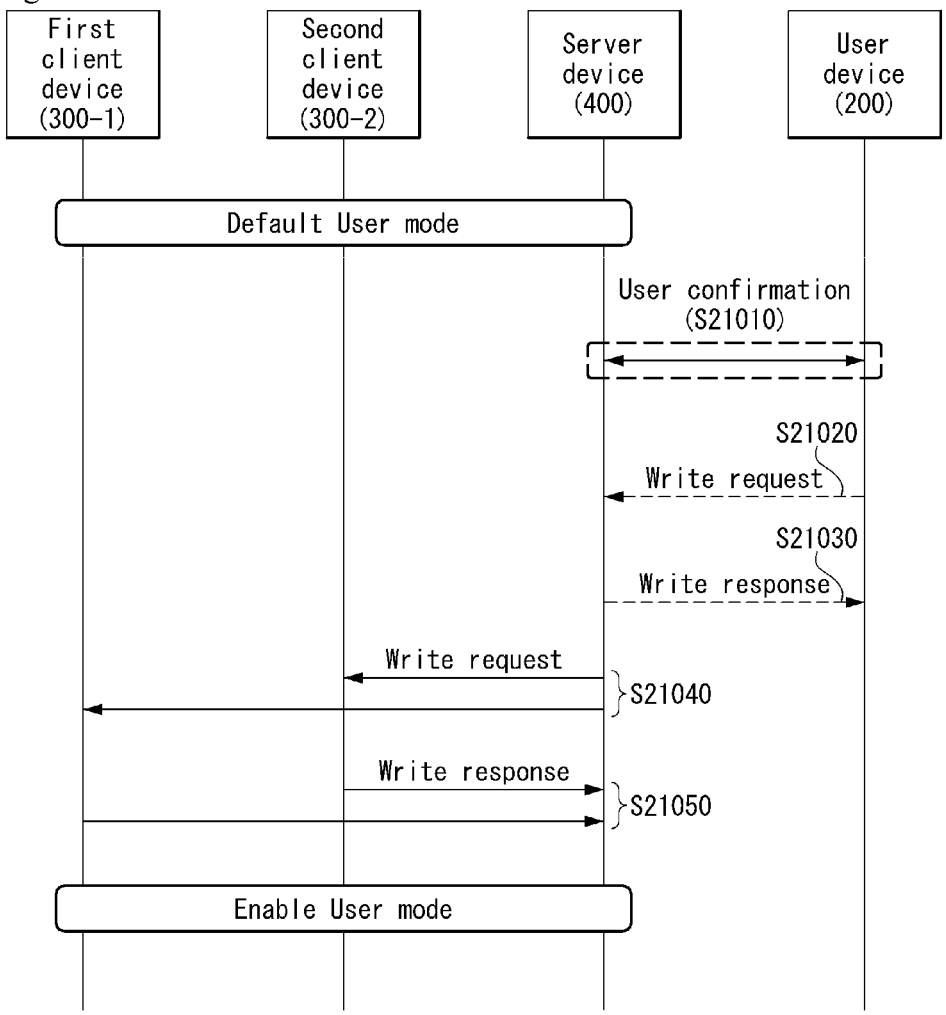

Fig.22

| Characteristic Name | Properties | Description |
|---|---|---|
| Status Information | Read, Indicate | Device status information such as ON and OFF |
| Service Information | Read, Indicate | List of services provided by devices |
| Group Parameter Change Control Point | Write, Indicate | Used when a user device instructs a proxy server to change advertising and connection parameters of proxy clients |
| Parameter Change Control Point | Write, Indicate | Used when a proxy device instructs proxy clients to change advertising and connection parameters |
| Registered device list | Read, Write, Indicate | Device information registered through proxy service register ex:Bluetooth device address (12:08:c1:bf:78:aa) |
| Connection Parameter | Read, Write, Indicate | transmitWindowSize, transmitWindowOffset, connInterval, connSlaveLatency, connSupervisionTimeout etc. |
| Advertising Parameter | Read, Write, Indicate | Advertising_Interval_Min, Advertising_Interval_Max, Advertising_Type, Tx_Power etc. |

GATT Charactertistic

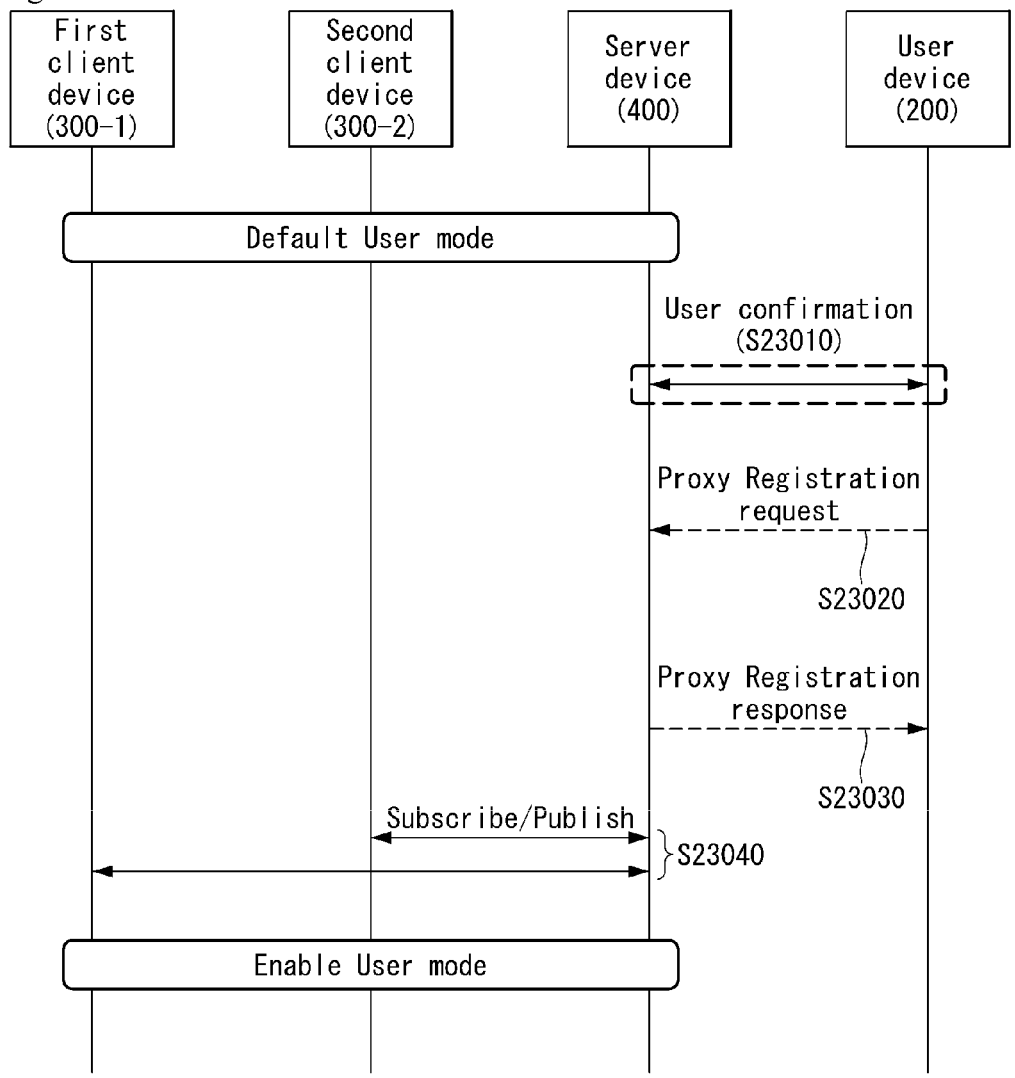

Fig.24

| FC (2byte) | Duration (4byte) | A1 (6byte) | A2 (6byte) | A3 (6byte) | Seq.Ctrl (2byte) | Time Stamp (2byte) | Beacon Interval (2byte) | Capability (2byte) | NAN IE (Var) | FCS (4byte) |
|---|---|---|---|---|---|---|---|---|---|---|

| Field | Size(Octets) | Value(Hex) | Description |
|---|---|---|---|
| Attribute ID | 1 | Variable | Identifies the type of NAN attribute |
| Length | 2 | Variable | Length of the following fields in the attribute |
| Attribute Body Field | Variable | Variable | NAN Attribute specific information fields |

# METHOD AND DEVICE FOR TRANSMITTING/RECEIVING DATA IN WIRELESS COMMUNICATION SYSTEM

CROSS REFERENCE TO RELATED APPLICATIONS

This application is the National Phase of PCT International Application No. PCT/KR2016/007632, filed on Jul. 13, 2016, which claims priority under 35 U.S.C. 119(e) to U.S. Provisional Application No. 62/191,533, filed on Jul. 13, 2015, all of which are hereby expressly incorporated by reference into the present application.

TECHNICAL FIELD

The present invention relates to a method and device for transmitting/receiving data between devices in a wireless communication system, and particularly, to a method and device for transmitting/receiving data depending upon device status.

BACKGROUND ART

Bluetooth is a short-range wireless technology standard that may wirelessly connect various types of devices and allows them to exchange data over short distances. To enable wireless communication between two devices using Bluetooth communication, a user has to perform the process of discovering Bluetooth devices to communicate with and making a connection request. As used herein, the term "device" refers to an appliance or equipment.

In this case, the user may discover a Bluetooth device according to a Bluetooth communication method intended to be used with the Bluetooth device using the Bluetooth device, and then perform a connection with the Bluetooth device.

The Bluetooth communication method may be divided into as a BR/EDR method and an LE method. The BR/EDR method may be called a Bluetooth Classic method. The Bluetooth Classic method includes a Bluetooth technology led from Bluetooth 1.0 and a Bluetooth technology using an enhanced data rate (EDR) supported by Bluetooth 2.0 or a subsequent version.

A BLE technology applied, starting from Bluetooth 4.0, may stably provide information of hundreds of kilobytes (KB) at low power consumption. Such a BLE technology allows devices to exchange information with each other using an attribute protocol. The BLE method may reduce energy consumption by reducing the overhead of a header and simplifying the operation.

Some of the Bluetooth devices do not have a display or a user interface. The complexity of a connection, management, control, and a disconnection between various Bluetooth devices and Bluetooth devices using similar technologies is increasing.

Bluetooth supports a high speed at a relatively low cost with relatively low power consumption. However, Bluetooth is appropriately used within a limited space because it has a maximum transmission distance of 100 m.

DISCLOSURE

Technical Problem

To transmit/receive data through connection between devices in a wireless communication system, first, it is necessary to discover a counterpart device to/from which data will be transmitted/received.

However, when a device to be connected is continuously discovered in real time, power consumption may increase.

For example, although Bluetooth Low Energy has been devised for the purpose of high energy efficiency in execution of various wireless communication functions, it requires high power to execute a function such as scanning of continuously discovering neighboring devices.

If a procedure of discovering neighboring devices is not continuously performed in order to reduce power consumption, it is difficult to detect information related to statuses of neighboring devices in real time. That is, there is a trade-off between real-time recognition of statuses of neighboring devices and power consumption of devices.

Wi-Fi also has a problem that power consumption for discovery and connection of devices is high.

Accordingly, a method for discovering neighboring devices without consuming high device power in a wireless communication system is needed.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To solve the aforementioned problem, the present invention provides a method for transmitting/receiving, by a server device, data with a client device in a wireless communication system, including: registering the client device by storing device information indicating the client device in a list; updating the status of the client device from the client device; and transmitting first status information indicating the updated status to a user device.

In the present invention, the step of updating includes receiving second status information indicating a changed status when the status of the client device changes.

In the present invention, the step of updating includes receiving second status information indicating the current status of the client device from the client device and updating the status of the client device based on the second status information.

In the present invention, the step of updating updates the status of the device to an OFF status when second status information indicating the current status of the client device is not received from the client device within a specific time.

The present invention further includes transmitting a parameter indicating a transmission period of second status information indicating the current status of the client device to the client device.

The present invention includes: receiving, from the user device, a request message for requesting change of the parameter indicating the transmission period of the second status information; and transmitting a response message in response to the request message to the user device, wherein the request message includes the parameter.

In the present invention, the second status information indicates one of ON, booting and OFF of the client device.

The present invention further includes: receiving, from the user device, a request message for requesting data transmission/reception with the client device; and transmitting, to the user device, a response message including first scheduling information for data transmission/reception with m the client device.

The present invention further includes transmitting second scheduling information for data transmission/reception with the user device to the client device.

In the present invention, each of the first scheduling information and the second scheduling information includes at least one of channel position information of a channel for transmitting/receiving data with the client device, a channel ID indicating the channel, channel state information indicating a state of the channel, connection parameter information related to connection between the user device and the client device, or time information for data transmission/reception between the user device and the client device.

The present invention provides a method for transmitting/receiving, by a user device, data to/from a client device in a wireless communication system, including: receiving status information indicating a status of the client device from a server device, the status information indicating one of ON, Butting and OFF of the client device; receiving a request message for requesting data transmission/reception with the client device to the server device when the status information indicates ON; receiving, from the server device, a response message including scheduling information for data transmission/reception with the client device; and transmitting/receiving data with the client device based on the scheduling information.

In the present invention, the scheduling information includes at least one of channel position information of a channel for transmitting/receiving data with the client device, a channel ID indicating the channel, channel state information indicating a state of the channel, connection parameter information related to connection between the user device and the client device, or time information for data transmission/reception between the user device and the client device.

The present invention provides a server device for transmitting/receiving data with a client device in a wireless communication system, including: a communication unit configured to communicate with the outside in a wireless or wired manner; and a processor functionally connected to the communication unit, wherein the processor controls to register the client device by storing device information indicating the client device in a list, to update the status of the client device from the client device and to transmit first status information indicating the updated status to a user device.

Advantageous Effects

According to the present description, it is possible to reduce power used for a user device to discover neighboring devices by discovering neighboring devices through a server device and receiving a discovery result.

In addition, according to the present description, it is possible to update status information of neighboring devices when statuses of the neighboring devices are changed to check status variations of the neighboring devices in real time.

Furthermore, according to the present description, it is possible to check status variations of neighboring devices in real time and simultaneously reduce power used to discover neighboring devices by receiving changed status information of a neighboring device through the server device whenever the status of the neighboring device is changed.

Moreover, according to the present description, status information update of the server device and a client device is frequently performed when the user device is located around the server device and the client device and a long update interval is set when the user device is not located around the server device and the client device, and thus power consumption of the server device and the client device can be reduced.

Further, according to the present description, the server device transmits information for transmitting/receiving data to the user device and the client device, and thus the user device and the client device can efficiently transmit/receive data.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 21 is a flowchart illustrating an example of a method for changing a parameter of a device proposed in the present description;

FIG. 22 shows an example of GATT characteristics proposed in the present description;

FIG. 23 is a flowchart illustrating another example of the method for changing a parameter of a device proposed in the present description;

FIG. 24 shows an example of a message format transmitted/received through Wi-Fi proposed in the present description.

MODE FOR INVENTION

Figure 1:
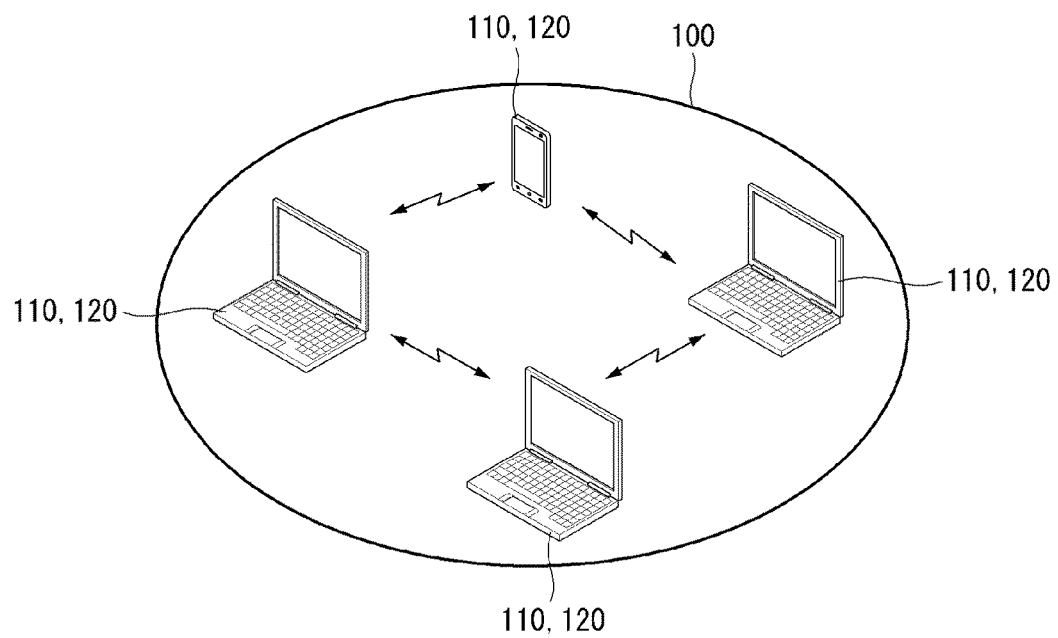
FIG. 1 shows an example of a wireless communication system using a BLE technology according to an embodiment of the present invention.

Hereinafter, the present invention is described in more detail with reference to appended drawings.

A suffix, such as "module" and "unit" introduced in the description herein, is assigned merely to facilitate description of this document, and the "module" and "unit" may be used interchangeably.

In this document, a device refers to a device capable of wireless communication, including a mobile phone, such as a smart phone, a tablet PC, a desktop computer, a notebook, and television, such as smart TV and IPTV.

Hereinafter, embodiments of the present invention are described in detail with reference to the accompanying drawings and description contained in the drawings, but the technical scope of the present invention is not restricted by the embodiments.

Wherever possible, general terms widely known to the public have been chosen as long as the terms do not obscure their technical functions intended in the present invention; however, those terms may be changed depending on the intention of those skilled in the art, practices, or the advent of a new technology.

In some cases, specific terms are chosen arbitrarily; in that case, a specific meaning of a corresponding term is described in a corresponding description.

Therefore, the terms used in this document should be interpreted on the basis of their actual meanings and description throughout the document rather than the immediate names of the terms.

FIG. 1 shows an example of a wireless communication system using a BLE technology according to an embodiment of the present invention.

The wireless communication system 100 includes at least one server device 110 and at least one client device 120.

The server device and the client device perform Bluetooth communication using Bluetooth low energy (hereinafter referred to as "BLE", for convenience sake) technology.

First, compared to a Bluetooth basic rate/enhanced data rate (BR/EDR) technology, the BLE technology requires a relatively small duty cycle. Products based on the BLE technology may be manufactured at a low cost, and may require very small power consumption at a low speed data transfer rate. The products may operate more than one year with a coin cell battery.

Furthermore, the BLE technology simplifies a connection procedure between devices and requires a smaller packet size than the Bluetooth BR/EDR technology.

Features of the BLE technology may be summarized as follows: (1) the number of RF channels is 40, (2) a data transfer rate of 1 Mbps is supported, (3) a star topology is used, (4) latency is 3 ms, (5) a maximum current is less than 15 mA, (6) output power is less than 10 mW (10 dBm), and (7) major application fields include mobile phones, watch, sports, health-care, sensor, and device control.

The server device 110 may operate as a client device in a relationship with a different device. Likewise, the client device may operate as a server device in a relationship with a different device. In other words, in a BLE communication system, a device may operate as a server device or a client device. In some cases, a device may operate as a server device and a client device at the same time.

The server device 110 may be called a data service device, master device, master, server, conductor, host device, audio source device, or first device. The client device may be called a slave device, slave, client, member, sink device, audio sink device, or second device.

The server device and the client device form a main part of a wireless communication system, and the wireless communication system may include other elements in addition to the server device and the client device.

The server device refers to a device which receives data from a client, directly performs communication with the client device. When receiving a data request from the client device, the server device provides data to the client device through a response.

Furthermore, the server device sends a notification message and indication message to the client device to provide information to the client device. Furthermore, when transmitting an indication message to the client device, the server device receives a confirm message corresponding to the indication message from the client device.

Furthermore, the server device may provide information to the user through a display unit or receive a request input from the user through a user input interface while transmitting and receiving notification, indication, and confirm messages to and from the client device.

Furthermore, the server device may read data from a memory unit or write new data to the corresponding memory while transmitting and receiving messages to and from the client device.

Furthermore, one server device may be connected to a plurality of client devices and may be easily connected to client devices again using bonding information.

The client device 120 refers to a device which requests information and data transmission from a server device.

The client device receives data from the server device through a notification message and indication message. When receiving an indication message from the server device, the client device sends a confirm message to the server device.

Like the server device, the client device may provide information to a user through a display unit or may receive an input from the user through a user input interface while transmitting and receiving messages to and from the server device.

Furthermore, the client device may read data from the memory unit or write new data into the memory unit while transmitting and receiving messages to and from the server device.

Hardware components, such as the display unit, user input interface, and memory unit of the server device or client device, are described in detail with reference to FIG. 2.

Furthermore, the wireless communication system may form a personal area network (PAN) using a Bluetooth technology. For example, the wireless communication system may exchange files and documents in a prompt and safe manner by forming a private piconet among devices.

A BLE device may operate in order to support various Bluetooth-related protocols, profiles, and processes.

Figure 2:
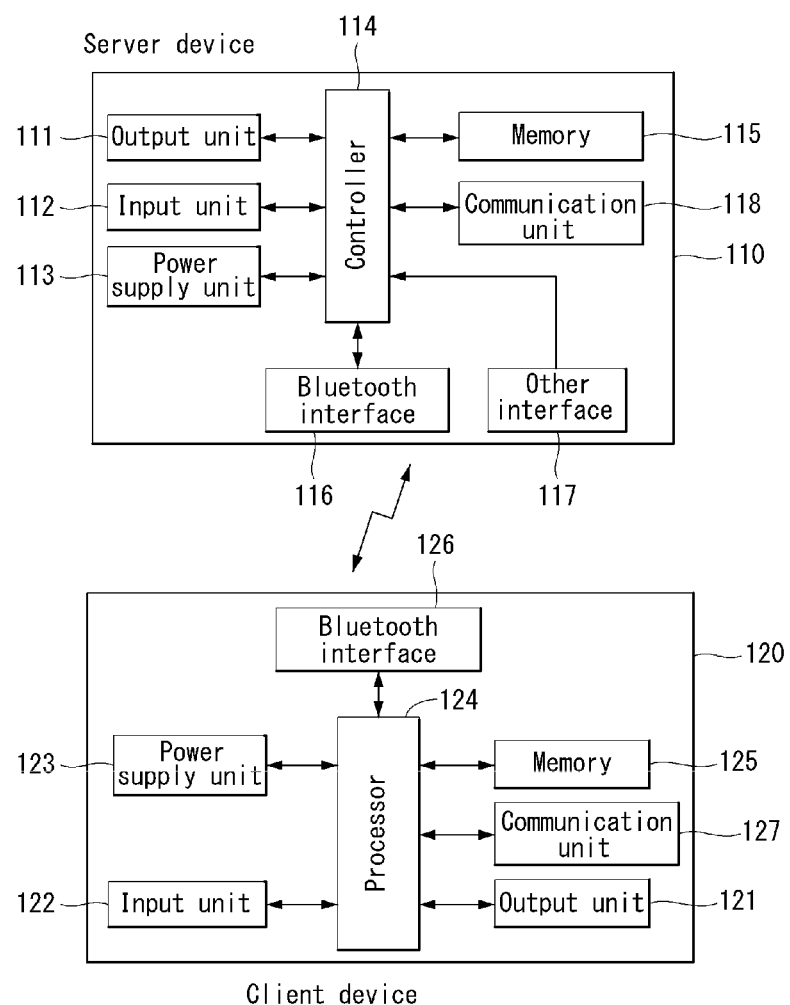
FIG. 2 shows an example of an internal block diagram of a server device and a client device capable of implementing methods according to embodiments of the present invention.

FIG. 2 shows an example of the internal block diagram of a server device and client device capable of implementing methods according to embodiments of the present invention.

The server device may be connected to at least one client device.

Furthermore, in some embodiments, the internal block diagram of each device may further include other elements (or modules, blocks or units), and some of the elements of FIG. 2 may be omitted.

As shown in FIG. 2, the server device includes a display unit 111, a user input interface 112, a power supply unit 113, a processor (or controller) 114, a memory unit 115, a Bluetooth interface 116, another interface 117, and a communication unit (or transmission/reception unit) 118.

The display unit 111, user input interface 112, power supply unit 113, processor 114, memory unit 115, Bluetooth interface 116, another interface 117, and communication unit 118 are functionally interconnected so as to perform a method according to an embodiment of the present invention.

Furthermore, the client device includes a display unit 121, a user input interface 122, a power supply unit 123, a processor 124, a memory unit 125, a Bluetooth interface 126, and a communication unit (or transmission/reception unit) 127.

The display unit 121, user input interface 122, power supply unit 123, processor 124, memory unit 125, Bluetooth interface 126, and communication unit 127 are functionally interconnected so as to perform a method according to an embodiment of the present invention.

The Bluetooth interface 116, 126 refers to a unit (or module) capable of transmitting a request/response, command, notification, indication/confirm message, or data between devices using the Bluetooth technology.

The memory 115, 125 is implemented in various types of devices and refers to a unit in which various data is stored.

The processor 114, 124 refers to a module for controlling an overall operation of the server device or the client device, and controls the server device or the client device in order in order to request the transmission of a message through the Bluetooth interface or other interface and to process a received message.

The processor 114, 124 may be represented by a controller or a control unit.

The processor 114, 124 may include application-specific integrated circuits (ASICs), other chipsets, logical circuits and/or data processing devices.

The memory 115, 125 may include read-only memory (ROM), random access memory (RAM), flash memory, a memory card, a storage medium and/or other storage devices.

The communication unit 118, 127 may include a baseband circuit for processing a radio signal. If an embodiment is implemented in the form of software, the aforementioned method may be implemented by a module (process or function) which performs the aforementioned function. The module is stored in the memory and is performed by the processor.

The memory 115, 125 may be installed inside or outside the processor 114, 124 and may be connected to the processor 114, 124 through various well-known means.

The display unit 111, 121 refers to a module for providing status information about a device and message exchange information to a user through a display.

The power supply unit 113, 123 refers to a module for receiving external or internal power under the control of the controller and for supplying power for the operation of each element.

As described above, BLE technology is characterized by a small duty cycle, and considerably reduces power consumption at a low data transfer rate. Accordingly, the BLE technology is capable of supplying power for the operation of each element even with small output power (which is less than 10 mW (10 dBm)).

The user input interface 112, 122 refers to a module for providing a user input, such as a display button to the controller, so that the user may control the operation of a device.

Figure 3:
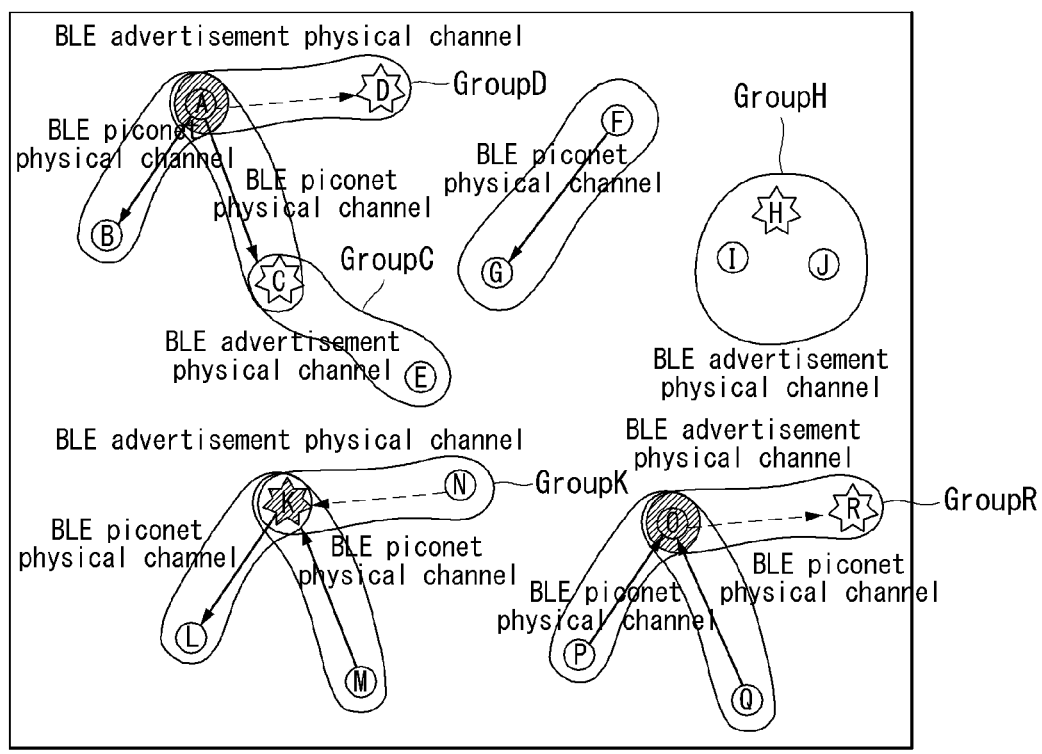
FIG. 3 shows an example of a BLE network topology.

FIG. 3 shows an example of a BLE network topology.

Referring to FIG. 3, a device A corresponds to a piconet (piconet A, the shaded area) master having a device B and a device C as slaves.

In this case, a piconet refers to a set of devices in which one of a plurality of devices functions as a master and the others occupy a shared physical channel connected to the master device.

A BLE slave does not share a common physical channel with a master. Each slave communicates with a master through a separate physical channel. There is another piconet (piconet F) including a master device F and a slave device G.

A device K belongs to a scatternet K. In this case, the scatternet refers to a group of piconets interconnected to each other.

A device K is the master of a device L and also a slave of a device M.

A device O also belongs to a scatternet O. The device O is a slave of a device P and also a slave of a device Q.

FIG. 3 illustrates a case where five different device groups are formed.

A device D is an advertiser, and a device A is an initiator (group D).

A device E is a scanner, and a device C is an advertiser (group C).

A device H is an advertiser, and a device I and a device J are scanners (group H).

The device K is also an advertiser, and a device N is an initiator (group K).

A device R is an advertiser, and the device O is an initiator (group R).

The device A and the device B use one BLE piconet physical channel.

The device A and the device C use another BLE piconet physical channel.

In the group D, the device D performs advertising using an advertisement event which may be connected to an advertising physical channel, and the device A is an initiator. The device A may establish a connection to the device D and add a device to the piconet A.

In the group C, the device C performs advertising through an advertising physical channel using a certain type of an advertisement event captured by the scanner device E.

The group D and the group C may use different advertising physical channels or different time frames so as to avoid a collision.

The piconet F has one physical channel. The device F and the device G use a single BLE piconet physical channel. The device F is a master, and the device G is a slave.

The group H has one physical channel. The devices H, I, and J use one BLE advertising physical channel. The device H is an advertiser, and the devices I and J are scanners.

In the scatternet K, the devices K and L use a single BLE piconet physical channel. The devices K and M use another BLE piconet physical channel.

In the group K, the device K performs advertising using an advertisement event which may be connected to an advertising physical channel, and the device N is an initiator. The device N may establish a connection with the device K. In this case, the device K functions as a slave of two devices and also as a master of one device.

In the scatternet O, the devices O and P use a single BLE piconet physical channel. The devices O and Q use different BLE piconet physical channels.

In the group R, the device R performs advertising using an advertisement event which may be connected to an advertising physical channel, and the device O is an initiator. The device O may establish a connection with the device R. In this case, the device O functions as a slave of two devices and also a master of one device.

Figure 4:
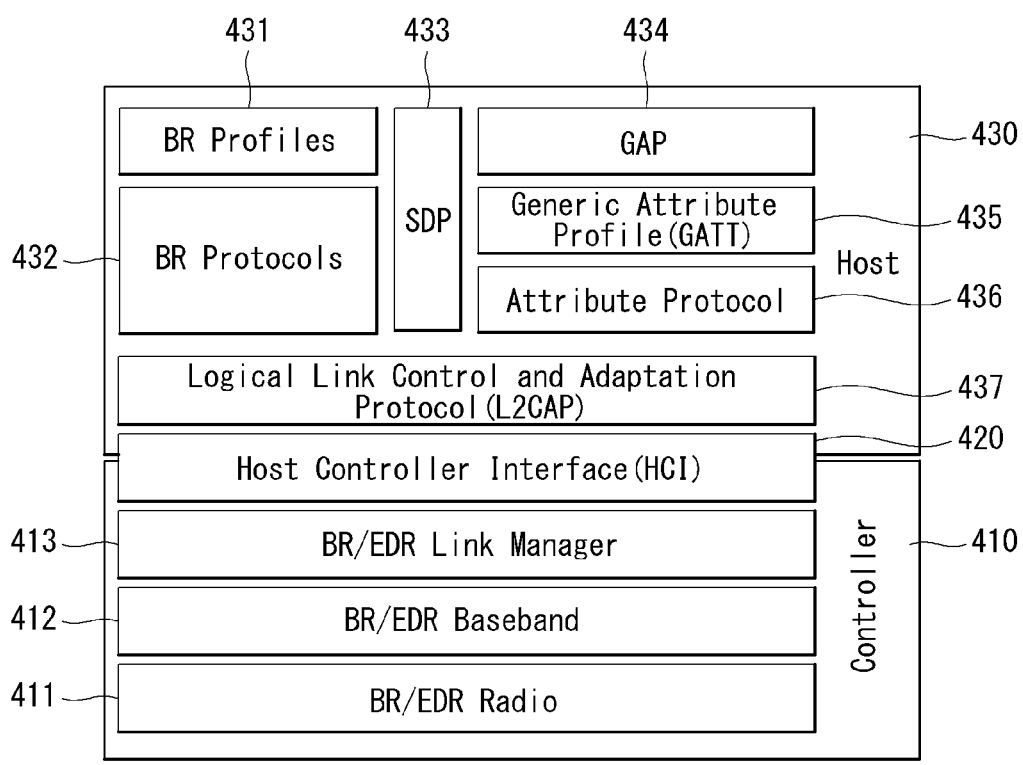
FIGS. 4 and 5 show examples of Bluetooth communication architecture to which methods according to embodiments of the present invention may be applied.
Figure 5:
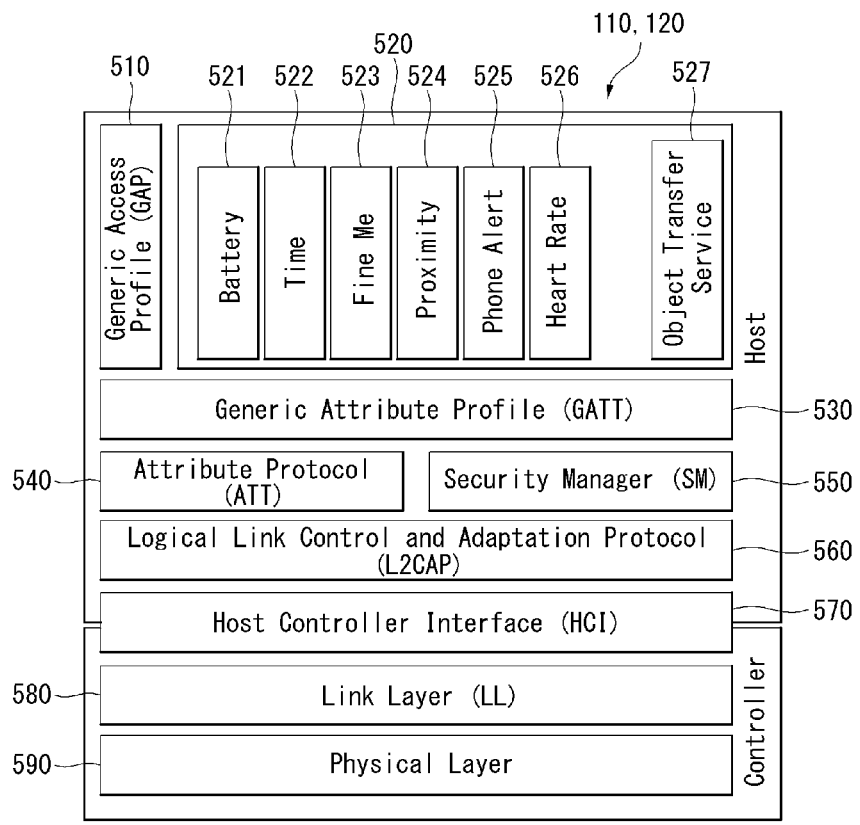

FIGS. 4 and 5 illustrate an example of Bluetooth communication architecture to which methods according to embodiments of the present invention may be applied.

More specifically, FIG. 4 shows an example of the Bluetooth BR/EDR technology, and FIG. 5 shows an example of Bluetooth Low Energy (BLE) architecture.

First, as shown in FIG. 4, the Bluetooth BR/EDR architecture includes a controller stack 410, a host controller interface (HCI) 420, and a host stack 430.

The controller stack 410 (or controller module) refers to hardware for sending or receiving Bluetooth packets to and from a wireless transmission and reception module dealing with Bluetooth signals of 2.4 GHz. The controller stack 410 includes a BR/EDR Radio layer 411, a BR/EDR Baseband layer 412, and a BR/EDR Link Manager layer 413.

The BR/EDR Radio layer 411 sends and receives radio signals of 2.4 GHz, and is capable of transmitting data by hopping 79 RF channels when Gaussian frequency shift keying (GFSK) modulation is used.

The BR/EDR baseband layer 412 sends a digital signal, selects a channel sequence in which hopping is performed 1600 times per second, and sends time slot spanning of 625 us for each channel.

The link manager layer 413 controls an overall operation of BLE, such as link setup, control, and security, using a link manager protocol (LMP).

The link manager layer 413 may perform the following functions.
  Control of ACL/SCO logical transport and logical link setup
  Detach: removes a connection and informs a corresponding device of a cause of removal.
  Performs power control and role switch
  Performs a security function, such as authentication, pairing, and encryption.

The host controller interface layer 420 provides an interface between a host module 430 and a controller module 410 so that a host may provide a command and data to a controller and the controller may provide an event and data to the host.

The host stack (or host module) 430 includes a logical link control and adaptation protocol (L2CAP) 437, a service discovery protocol (SDP) 433, a BR/EDR protocol 432, BR/EDR profiles 431, an attribute protocol 436, a generic access profile (GAP) 434, and a generic attribute profile (GATT) 435.

The L2CAP 437 provides one bilateral channel for sending data according to a specific protocol or specific profile.

The L2CAP multiplexes various protocols and profiles provided by Bluetooth upper layers.

The L2CAP of the Bluetooth BR/EDR specification uses a dynamic channel; supports a protocol service multiplexer, retransmission, and streaming mode, and provides segmentation and reassembly, per-channel flow control, and error control.

The SDP 433 refers to a protocol used to search for a service (or a profile and protocol) supported by a Bluetooth service.

The BR/EDR protocols and profiles 432, 431 define a service using the Bluetooth BR/EDR specification and an application protocol by which an exchange of data is performed.

The attribute protocol 436 relies on a server-client structure, which defines a rule for a corresponding device so as to access data. Six message types are defined as below: a Request message, a Response message, a Command message, a Notification message, and an Indication message.
  Request message from a client to a server with a Response message from a server to a client
  Command message from a client to a server without a Response message
  Notification message from a server to a client without a Confirm message
  Indication message from a server to a client with a Confirm message from a client to a server The GATT 435 defines an attribute type.

The GAP 434 defines a method for discovering and connecting a device, and a method for providing information to a user. The GAP provides a privacy scheme.

As shown in FIG. 5, the BLE structure includes a controller stack capable of processing a wireless device interface for which timing is critical and a host stack capable of processing high level data.

The controller stack may also be called a controller. In order to avoid confusion with the processor, that is, an internal element of the device described with reference to FIG. 2, however, the controller stack may be preferably used below.

First, the controller stack may be implemented using a communication module which may include a Bluetooth wireless device and a processor module which may include a processing device, such as a microprocessor.

The host stack may be implemented as part of an OS operating on the processor module or as a package instance on an OS.

In some cases, the controller stack and the host stack may operate or may be performed on the same processing device within the processor module.

The host stack includes a generic access profile (GAP) 510, GATT based profiles 520, a generic attribute profile (GATT) 530, an attribute protocol (ATT) 540, a security manager (SM) 550, and a logical link control and adaptation protocol (L2CAP) 560. The host stack is not limited to the aforementioned composition, but may include various protocols and profiles.

The host stack multiplexes various protocols and profiles provided by that Bluetooth specification using the L2CAP.

First, the L2CAP 560 provides one bilateral channel for sending data to according to a specific protocol or specific profile.

The L2CAP is capable of multiplexing data between upper layer protocols, segmenting or reassembling packages, and managing multicast data transmission.

BLE uses three fixed channels for respective signaling, a security manager, and an attribute protocol.

BR/EDR uses a dynamic channel and supports a protocol service multiplexer, retransmission, streaming mode.

The SM 550 authenticates a device, which is a protocol for providing a key distribution.

The ATT 540 relies on a server-client structure, which defines rules for a corresponding device for data access. Six message types are defined: Request, Response, Command, Notification, Indication, and Confirmation.

① Request and Response message: the Request message is used when a client device requests specific information from a server device, and the Response message is used in response to a Request message, which is transmitted from the server device to the client device.

② Command message: The Command message is transmitted from a client device to a server device in order to indicate a command for a specific operation, but the server device does not send a response to a Command message to the client device.

③ Notification message: A server device sends this message to a client device in order to provide notification of an event, but the client device does not send a confirmation message to the server device in response to a Notification message.

④ Indication and Confirm message: A server device sends this message to a client device in order to provide notification of an event. Unlike in the Notification message, the client device sends a Confirm message to the server device in response to an Indication message.

The GAP is a layer newly implemented to support the BLE technology, and is used to control' the selection of a role for communication between BLE devices and a multi-profile operation.

The GAP is mainly used for device discovery, connection establishment, and security. That is, the GAP defines a method for providing information to a user and also defines the following attribute types.

① Service: A combination of actions related to data, and it defines the basic operation of a device.

② Include: Define a relationship between services.

③ Characteristics: A data value used by a service

④ Behavior: A format that may be readable by a computer, which is defined by a Universal Unique Identifier (UUID) and a value type.

The GATT-based profiles are dependent on the GATT and are mainly applied to BLE devices. The GATT-based profiles may include Battery, Time, FindMe, Proximity, Object Delivery Service and so on. More specific descriptions of the GATT-based profiles are as follows.

Battery: A method for exchanging battery information.
Time: A method for exchanging time information.
FindMe: It provides an alarm service according to the distance.
Proximity: A method for exchanging battery information.
Time: A method for exchanging time information.

The GATT may be used as a protocol by which to describe how the ATT is utilized at the time of composing services. For example, the GATT may be used to define how the ATT profiles are grouped together with services and to describe characteristics associated with the services.

Therefore, the GATT and the ATT describe device statuses and services, and how features are associated with each other and how they are used.

The controller stack includes a physical layer 590, a link layer 580, and a host controller interface 570.

The physical layer 590 (or a wireless transmission and reception module) sends and receives radio signals of 2.4 GHz, and uses GFSK modulation and frequency hopping utilizing 40 RF channels.

The link layer 580 sends or receives Bluetooth packets.

Furthermore, the link layer establishes a connection between devices after performing the advertising and scanning function using three advertising channels, and provides a function of exchanging a maximum of 42 bytes of data packets through 37 data channels.

The host controller interface (HCI) provides an interface between the host stack and the controller stack so that the host stack may provide commands and data to the controller stack and the controller stack may provide events and data to the host stack.

Hereinafter, the procedure of BLE is described briefly.

The BLE procedure includes a device filtering procedure, an advertising procedure, a scanning procedure, a discovering procedure, and a connecting procedure.

Device Filtering Procedure

The device filtering procedure functions to reduce the number of devices which perform responses to requests, commands, or notification in the controller stack.

All of devices may not need to respond to received requests.

Accordingly, the controller stack reduces the number of transmitted requests so that power consumption can be reduced in the BLE controller stack.

An advertising device or a scanning device may perform the device filtering procedure in order to restrict the number of devices which receive advertisement packets, scan requests, or connection requests.

In this case, the advertising device refers to a device which sends an advertisement event, that is, a device which performs advertisement, and is also called an advertiser.

A scanning device refers to a device which performs scanning, that is, a device which sends a scan request.

In the BLE specification, if a scanning device receives part of advertisement packets from an advertising device, the scanning device has to send a scan request to the advertising device.

If the transmission of a scan request is not required as the device filtering procedure is used, however, the scanning device may ignore advertisement packets transmitted by an advertising device.

The device filtering procedure may be used even in the connection request procedure. If device filtering is used for the connection request procedure, the need for sending a response to a connection request may be made unnecessary by ignoring the connection request.

Advertising Procedure

An advertising device performs an advertisement procedure to perform non-directional broadcast using the devices within the range of the advertising device.

In this case, the non-directional broadcast refers to broadcast in all directions rather than broadcast in specific directions.

Unlike the non-directional broadcast, the directional broadcast refers to broadcast in a specific direction. Non-directional broadcast is performed without involving a connection procedure between devices in a listening state (hereinafter referred to as a "listening device").

The advertising procedure is used to establish a BLE to a nearby initiating device.

In some embodiments, the advertising procedure may be used to provide the periodic broadcast of user data to scanning devices which perform listening through an advertising channel.

In the advertising procedure, all of advertisements (or advertisement events) are broadcasted through an advertising physical channel.

An advertising device may receive a scan request from a listening device which performs a listening operation in order to obtain additional user data from the advertising device. In response to the scan request, the advertising device sends a response to the listening device which has sent the scan request through the same advertising physical channel through which the advertising device has received the scan request.

While broadcast user data sent as part of advertising packets forms dynamic data, scan response data is static for the most part.

An advertising device may receive a connection request from an initiating device through an advertising (or broadcast) physical channel. If the advertising device has used a connectable advertisement event and the initiating device has not been filtered by a filtering procedure, the advertising device stops an advertisement and enters connected mode. The advertising device may resume the advertisement after entering the connected mode.

Scanning Procedure

A device performing a scan operation, that is, a scanning device, performs a scanning procedure in order to listen to the non-directional broadcast of user data from advertising devices which use an advertising physical channel.

In order to request additional user data, a scanning device sends a scan request to an advertising device through an advertising physical channel. In response to the scan request, the advertising device includes additional user data requested by the scanning device in a scan response and sends the scan response to the scanning device through the advertising physical channel.

The scanning procedure may be used while a scanning device is connected to another BLE device in a BLE piconet.

If a scanning device receives a broadcast advertising event and stays in initiator mode where a connection request may be initiated, the scanning device may initiate BLE for an advertising device by sending a connection request to the advertising device through an advertising physical channel.

If a scanning device sends a connection request to an advertising device, the scanning device stops the entire scanning for additional broadcast and enters connected mode.

However, even in the case of Bluetooth LE designed to use low power, when the scanning procedure is continuously performed in order to discover neighboring devices, high power is required.

Discovering Procedure

Devices capable of Bluetooth communication (hereinafter referred to as "Bluetooth devices") perform an advertising procedure and a scanning procedure in order to discover devices around the Bluetooth devices or devices to be discovered by other devices within a given area.

The discovering procedure is performed in an asymmetric manner. A Bluetooth device searching for another Bluetooth device nearby is called a discovering device, and performs listening in order to search for devices that advertise advertisement events that may be scanned. A Bluetooth device which may be discovered and used by another device is called a discoverable device. A discoverable device actively broadcasts an advertisement event so that other devices can scan the discoverable device through an advertising (or broadcast) physical channel.

Both of the discovering device and the discoverable device may already have been connected to other Bluetooth devices in a piconet.

Connecting Procedure

A connecting procedure is asymmetric. In the connecting procedure, while a particular Bluetooth device performs an advertising procedure, other Bluetooth devices need to perform a scanning procedure.

In other words, the advertising procedure may be a primary task to be performed, and as a result, only one device may respond to an advertisement. After receiving a connectable advertisement event from an advertising device, the connecting procedure may be initiated by sending a connection request to the advertising device through an advertising (or broadcast) physical channel.

Operation statuses defined in the BLE technology, that is, an advertising state, a scanning state, an initiating state, and a connection state, are described briefly below.

Advertising State

The link layer (LL) enters the advertising state in a command from a host (or stack). If the link layer is in the advertising state, the link layer sends advertising packet data units (PDUs) at advertisement events.

Each advertisement event includes at least one advertising PDU, and the advertising PDU is transmitted through an advertising channel index. Each advertisement event may be previously closed if the advertising PDU is transmitted through each advertising channel index, the advertising PDU is terminated, or the advertising device needs to secure the space in order to perform other functions.

Scanning State

The link layer enters the scanning state in response to a command from a host (or stack). In the scanning state, the link layer listens to advertising channel indices.

The scanning state supports two types: passive and active scanning. The host determines a scanning type.

No separate time or advertising channel index is defined to perform scanning.

In the scanning state, the link layer listens to an advertising channel index for "scanWindow" duration. scanInterval is defined as the interval between the start points of two consecutive scan windows.

If there is no scheduling collision, the link layer has to perform listening in order to complete all of the scanIntervals of scanWindows as commanded by the host. In each scanWindow, the link layer has to scan other advertising channel indices. The link layer uses all of available advertising channel indices.

In the case of passive scanning, the link layer is unable to send any packet, but only receives packets.

In the case of active scanning, the link layer performs listening to the advertising device to rely on the advertising PDU type by which additional information related to the advertising PDUs and advertising device may be requested.

Initiating State

The link layer enters the initiating state in response to a command from a host (or stack).

In the initiating state, the link layer performs listening to advertising channel indices.

In the initiating state, the link layer listens to an advertising channel index for "scanWindow" duration.

Connection State

The link layer enters the connection state when a device makes a connection request, that is, an initiating device sends a CONNECT_REQ PDU to an advertising device or the advertising device receives a CONNECT_REQ PDU from the initiating device.

Establishing a connection may be taken into consideration after the link layer enters the connection state. However, establishing a connection when the link layer enters the connection state may not need to be taken into consideration. The only difference between a newly created connection and an existing connection is a supervision timeout value for a link layer connection.

When two devices are connected to each other, they play respective different roles.

A link layer playing the role of a master is called a master device, whereas a link layer playing the role of a slave is called a slave device. A master device adjusts timing of a connection event. In this case, the connection event denotes the time when the mast device and a slave device are synchronized.

A master device (or central device) is a device that periodically scans a connectable advertising signal in order to establish a connection with other devices (slave or peripheral devices), and requests an appropriate device to establish a connection.

Furthermore, once connected to a slave device, a master device sets up timing and supervises a periodic data exchange.

In this case, the timing may be a hopping rule applied to two devices which exchange data through the same channel.

A slave (or peripheral) device is a device that periodically sends a connectable advertising signal in order to establish a connection with other devices (master devices).

Therefore, if a master device which has received a connectable advertising signal sends a connection request, a slave device accepts the request and establishes a connection with the master device.

After a slave device establishes a connection with a master device, the slave device periodically exchanges data by hopping a channel according to timing specified by the master device.

The packets defined in the Bluetooth interface is described briefly below. BLE devices use the packets described below.

Packet Format

The link layer has only one packet format used for both an advertising channel packet and a data channel packet.

Each of the packets includes four fields: a preamble, an access address, a PDU, and CRC.

If one packet is transmitted through an advertising physical channel, the PDU may function as an advertising channel PDU. If one packet is transmitted through a data physical channel, the PDU may function as a data channel PDU.

Advertising Channel PDU

The advertising channel PDU includes a 16 bit header and a payload of various sizes.

The PDU type filed of an advertising channel included in the header supports PDU types defined in Table 1 below.

TABLE 1

| PDU Type | PACKet Name |
|---|---|
| 0000 | ADV-IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are called advertising PDUs and are used for specific events.

ADV_IND: a connectable non-directional advertisement event

ADV_DIREC_IND: a connectable directional advertisement event

ADV_NONCONN_IND: a non-connectable non-directional advertisement event

ADV_SCAN_IND: a non-directional advertisement event that may be scanned

The PDUs are transmitted by the link layer in the advertising state and are received by the link layer in the scanning state or initiating state.

Scanning PDUs

The advertising channel PDU type below is called a scanning PDU and is used in the status described below.

SCAN_REQ: transmitted by the link layer in the scanning state and received by the link layer in the advertising state.

SCAN_RSP: transmitted by the link layer in the advertising state and received by the link layer in the scanning state.

Initiating PDUs

The advertising channel PDU type below is called an initiating PDU.

CONNECT_REQ: transmitted by the link layer in the initiating state and received by the link layer in the advertising state.

Data Channel PDUs

The data channel PDU includes a 16 bit header and a payload of various sizes, and may include a Message Integrity Check (MIC) field.

The procedures, statuses, and packet formats of the BLE technology described above may be applied to perform methods according to embodiments of the present invention.

Figure 6:
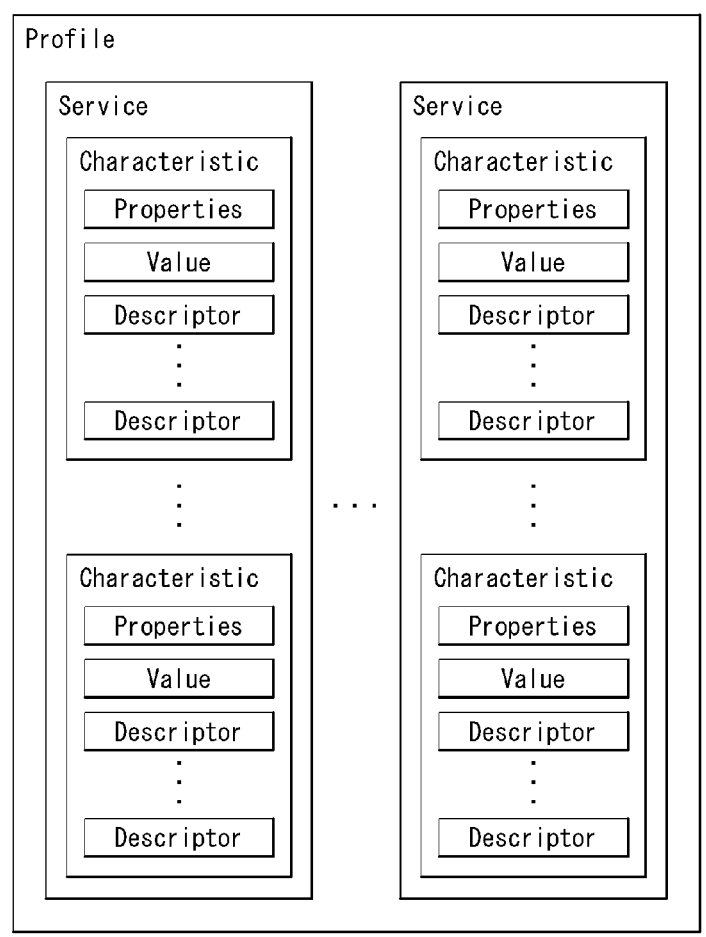
FIG. 6 shows an example of the GATT Profile structure of the BLE specification.

FIG. 6 shows an example of the GATT Profile structure of the BLE specification.

Referring to FIG. 6, one may see the structure for exchanging profile data defined in the BLE specification.

More specifically, the GATT defines a method for exchanging data using a service between BLE devices and characteristics thereof.

In general, a peripheral device (e.g., a sensor device) functions as a GATT server and performs the definition for the service and characteristics.

To read or write data, a GATT client sends a data request to the GATT server, initiates all of the transactions, and receives a response from the GATT server.

The GATT-based operational structure defined in the BLE is based on profiles, services, and characteristics, which form a hierarchical structure as shown in FIG. 6.

The profile may include one or more services, and the one or more services may include one or more characteristics or other services.

The service groups data into logical units and includes one or more characteristics or other services.

Each of the services has the identifier of 16 bits or 128 bits, which is called a universal unique identifier (UUID).

The characteristic forms the lowest unit in the GATT-based operational structure. The characteristic includes only one datum and has a UUID of 16 bits or 128 bits like the service.

The characteristic includes descriptors for various types of information and requires one attribute to describe each piece of information. The characteristic may use a couple of consecutive attributes.

The attribute includes four elements as follows.

Handle: the address of the attribute

Type: the type of the attribute

Value: the value of the attribute

Permission: an access right to the attribute

A connection procedure in BLE is described below. For example, a method for providing an object transfer service according to the BLE is described as the connection procedure.

Figure 7:
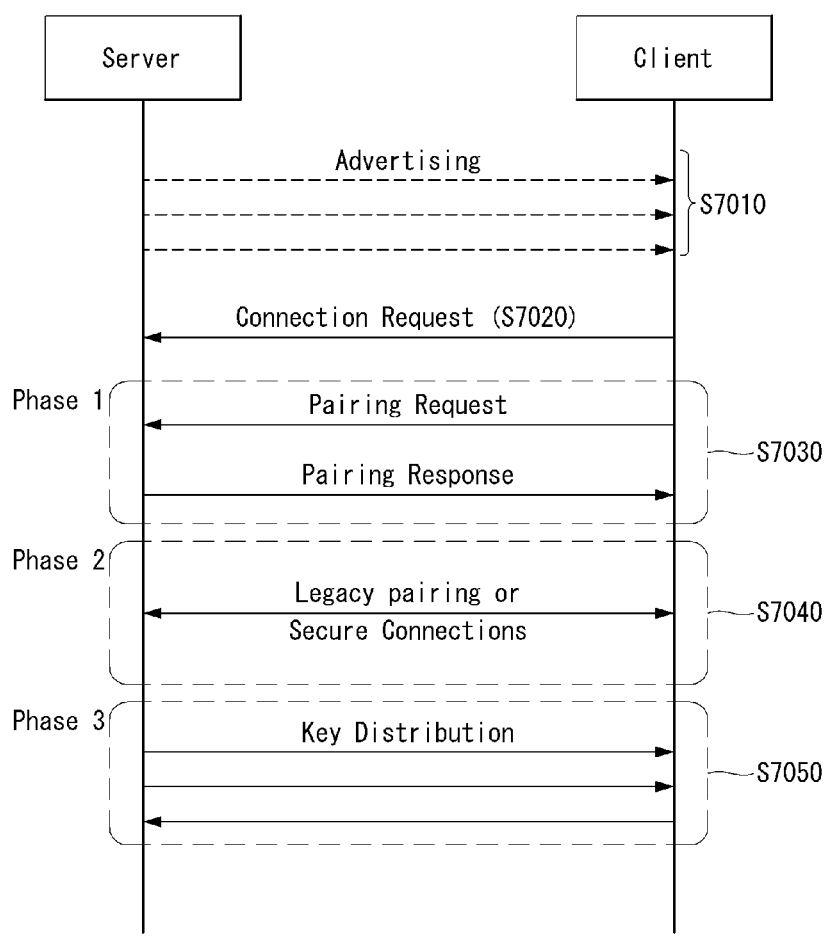
FIG. 7 shows an example of a method for the connection procedure of the BLE specification.

FIG. 7 shows an example of a method for the connection procedure of the BLE specification.

A server sends an advertisement message through three advertisement channels (S7010).

The server may be called an advertiser before a connection is established and may be called a master after the connection is established. Examples of the server include sensors (e.g., temperature sensors).

Furthermore, the client may be called a scanner before a connection is established and may be called a slave after the connection is established. The client may be a smart phone, for example.

As described above, Bluetooth communication uses a total of 40 channels through a frequency of 2.4 GHz. Three of the 40 channels are advertisement channels, which are used for exchanging packets to establish a connection in addition to various advertising packets.

The remaining 37 channels are data channels which are used for the exchange of data packets after a connection is established.

After receiving the advertisement message, the client may send a scan request to the server in order to obtain additional data (e.g., a server device name) from the server.

The server sends a scan response, together with the remaining data, to the client in response to the scan request.

In this case, the scan request and the scan response are one type of an advertisement packet which may include only user data of 31 bytes or less.

Therefore, if a data size is larger than 31 bytes, but with large overhead from established connection to send data, the data is divided into two blocks and transmitted twice using the scan request/scan response.

Next, the client sends, to the server, a connection request for establishing BLE with the server (S7020).

Accordingly, a link layer (LL) connection is established between the server and the client.

Thereafter, the server and the client perform a security establishment procedure.

The security establishment procedure may be construed as secure simple pairing or may be performed with the secure simple pairing being included therein.

In other words, the security establishment procedure may be performed through a phase 1 to a phase 3.

More specifically, a pairing procedure (i.e., the phase 1) is performed between the server and the client (S7030).

Through the pairing procedure, the client sends a pairing request to the server, and the server sends a pairing response to the client.

In the phase 2, a legacy pairing or secure connection is performed between the server and the client (S7040).

In the SSP phase 3, a key distribution procedure is performed between the server and the client (S7050).

Through the phases, a secure connection is established between the server and the client, and encrypted data may be transmitted and received.

Figure 8:
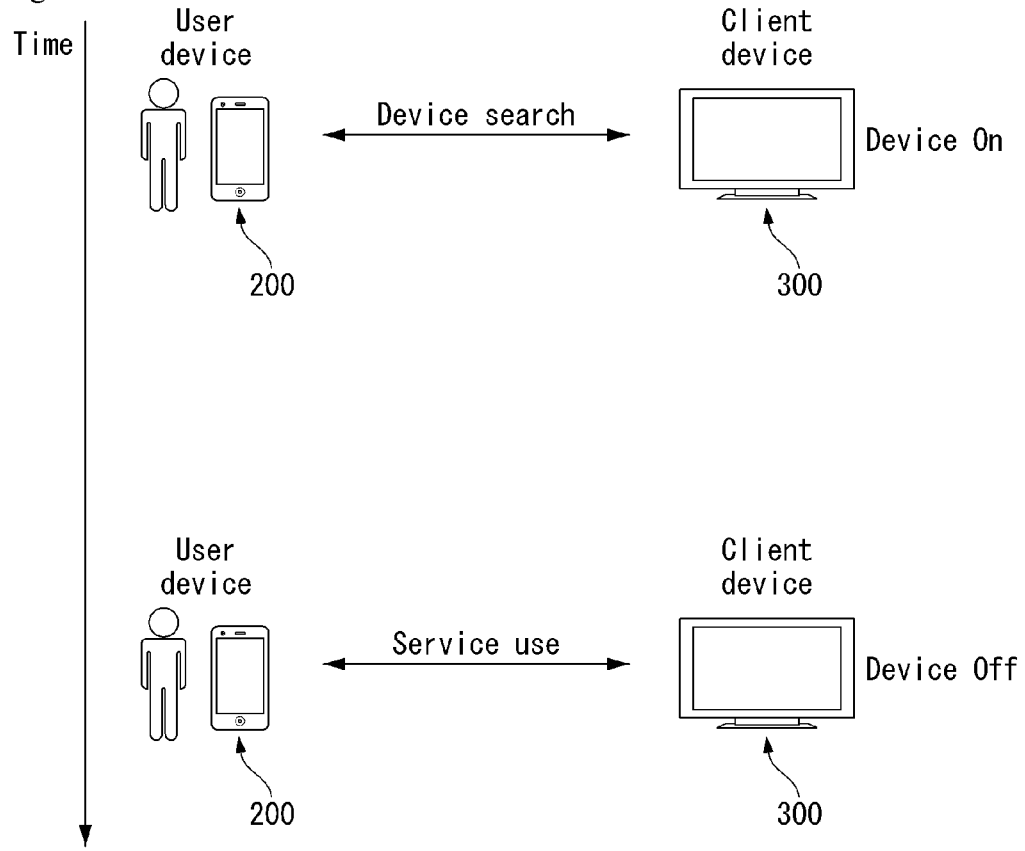
FIG. 8 shows an example of providing a service between a user device and a client device.

FIG. 8 shows an example of providing a service between a user device and a client device.

Referring to FIG. 8, a user device 200 needs to search neighboring devices (referred to as client devices 300 hereinafter) to be provided with a wireless communication service.

To discover a client device for providing the service, the user device 200 needs to continuously check when neighboring client devices leave a service providing area and whether new client devices are searched for.

In addition, since the status of the client device 300 may continuously change with time, the status of the client device 300 when the user device 200 searches for the client device 300 may not be the same as the status thereof when the user device 200 intends to use the service.

Accordingly, the user device 200 needs to continuously search for neighboring client devices in real time.

If a search procedure is not continuously performed in real time, the client device 300 may be turned off when the user device 200 uses the service although the client device 300 is turned on when discovered by the user device 200, and thus the user device 200 cannot use the service, as shown in FIG. 8.

However, as described above, high power is required for the user device 200 to search for neighboring client devices in real time.

Accordingly, to solve this problem, the present invention proposes a method for reducing power consumption while a user device discovers neighboring client devices in real time.

Figure 9:
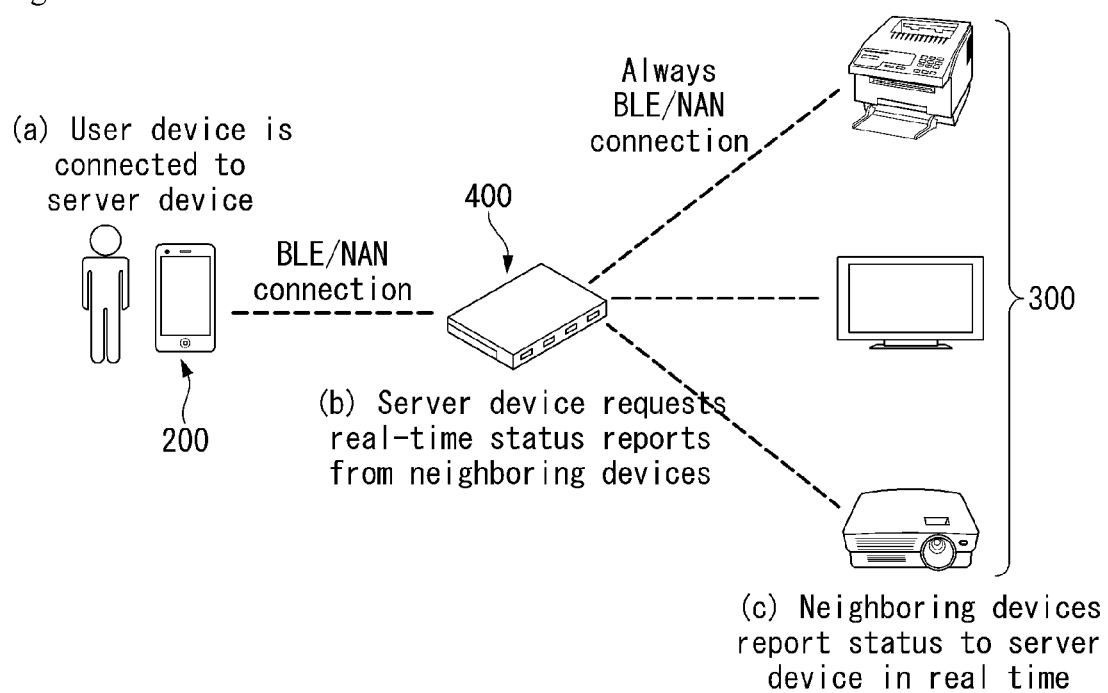
FIG. 9 shows an example of a method by which a user device checks a status of a client device through a server device proposed in the present description.

FIG. 9 shows an example of a method by which a user device checks statuses of client devices through a server device proposed in the present description.

Referring to FIG. 9, the user device may discover neighboring client devices through the server device, and when statuses of client devices change, confirm the status changes.

Specifically, (a) the user device 200 may establish connection with the server device and perform an authentication and acknowledgment procedure upon discovery of the server device.

Here, the authentication and acknowledgment procedure may refer to a procedure for checking whether the user device 200 and the server device 400 are located close to each other and whether the server device 400 has the authority to give orders to the user device 200 or whether the server device 400 has the authority to control the user device 200.

The server device 400 connected to the user device 200 may transmit information of a client device 300 connected to the server device 400 to the user device 200 such that the user device 200 can discover client devices.

In addition, (b) when the status of the client device 300 connected to the server device 400 changes, the server device 400 may request real-time reporting of the status change from the client device 300.

For example, the server device 400 can request change of parameters related to messages through which status change of the client device 300 can be checked to change the parameters and immediately receive a message including information related to a changed status whenever the status of the client device 300 changes or check whether a message periodically transmitted according to changed parameters is received to check the status of the client device 300.

(c) The client device 300 may announce status change to the server device 400 or the user device 200 in real time when a request from the server device 400 is received.

When the status of the client device 300 changes, the server device 400 may notify the user device 200 of the status change, and thus the user device 200 can check status change of the client device 300 without a real-time continuous search procedure.

Such a service through which a user device discovers a client device through a server device and transmits/receives messages is called a proxy service. In the proxy service, the server device may be called a proxy server device and the client device may be called a proxy client device.

Hereinafter, Bluetooth LE and/or Wi-Fi will be described as an example of a wireless communication system in the present invention. However, this is an example for facilitating description of the present invention and the present invention is not limited thereto and can be applied to various wireless communication systems.

Figure 10:
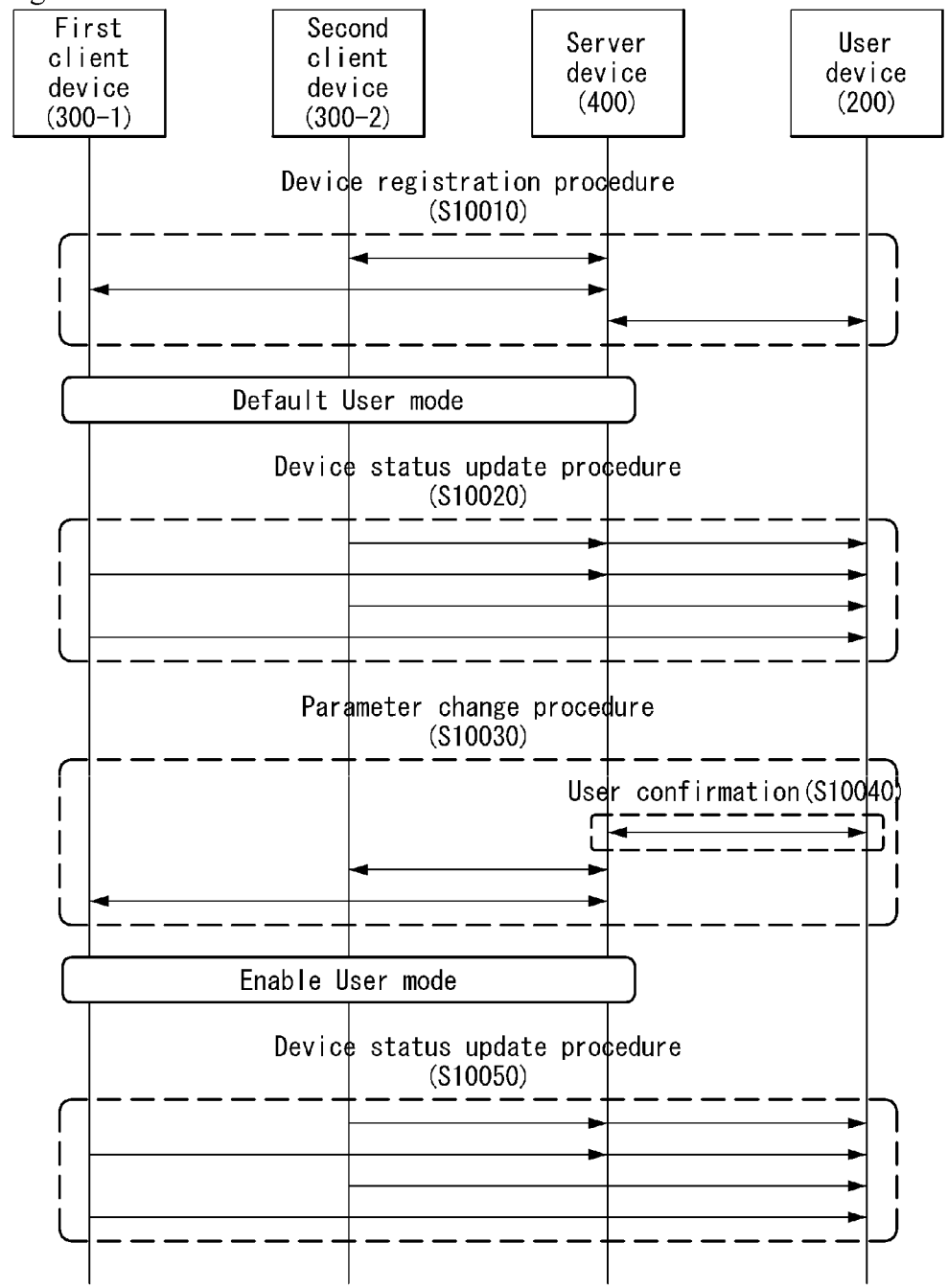
FIG. 10 is a flowchart illustrating an example of a method by which a user device checks and updates a status of a client device through a user device proposed in the present description.

FIG. 10 is a flowchart illustrating an example of a method by which a user device checks and updates statuses of client devices through a server device proposed in the present description.

Referring to FIG. 10, the server device may discover and register neighboring devices, and when statuses of registered client devices change, notify the user device of the changed statuses.

Specifically, the server device 400 may perform a device registration procedure with a neighboring user device 200 and client devices 300-1 and 300-2 to register information of each device (S10010).

Through this procedure, the server device 400 may establish connection with the user device 200 and/or the client devices 300-1 and 300-2 and store information related to the connected devices (e.g., device names, IDs, etc.) in a list indicating connected devices.

In addition, the client devices 300-1 and 300-2 and/or the user device 200 may also store information related to the server device 400 in a list.

Subsequently, the client devices 300-1 and 300-2 and the server device 400 operate in a default user mode when a user confirmation procedure is not performed.

The user confirmation procedure may refer to a procedure for checking whether the user device 200 and the server device 400 are located close to each other and whether the server device 400 has the authority to give orders to the user device 200 or whether the server device 400 has the authority to control the user device 200.

The default user mode is set to minimize power consumption of operations (e.g., message transmission and reception, discovery of neighboring devices, etc.) performed by devices.

In the default user mode, the client devices 300-1 and 300-2 perform a device status update procedure with the server device 400 and/or the user device 200 at a long period (S10020).

The client devices 300-1 and 300-2 may transmit status information and service information to the server device 400 at a long period.

The service information represents services which can be currently provided by the client devices and the status information represents current statuses of the client devices.

Upon reception of the service information and the status information, the server device 400 may transmit the service information and the status information to the user device 200.

Alternatively, the client devices 300-1 and 300-2 may directly transmit the service information and the status information to the user device 200.

In the default user mode, the server device 400 may perform a parameter change procedure with the user device 200 and the client devices 300-1 and 300-2 (S10030).

The server device 400 can perform the aforementioned user confirmation procedure with the user device 200 through the parameter change procedure.

Upon confirmation of the authority of the user device 200 through the user confirmation procedure, the server device 400 may request parameter change from the client devices 300-1 and 300-2.

For example, when statuses of the client devices 300-1 and 300-2 change, the server device 400 can request change of the service information and status information transmission period to a short period from the client devices 300-1 and 300-2 in order to notify the user device 20 of the status change.

The client devices 300-1 and 300-2 and the server device 400 which have changed parameters (e.g., transmission period and the like) through the parameter change procedure operate in an enable user mode.

The enable user mode is a mode in which the client devices 300-1 and 300-2 frequently change the status information and the service information such that the user device 200 can immediately recognize status change of the client devices 300-1 and 300-2.

That is, the enable user mode is a mode in which the status information and service information transmission period is set to a short period.

Status information and service information transmission is performed more frequently in a device update procedure (S10050) in the enable user mode than in the device update procedure (S10020) in the default user mode.

Through this method, the user device 200 can check status change of the client devices 300-1 and 300-2 through the server device 400 or the client devices 300-1 and 300-2 without continuously discovering neighboring client devices.

Figure 11:
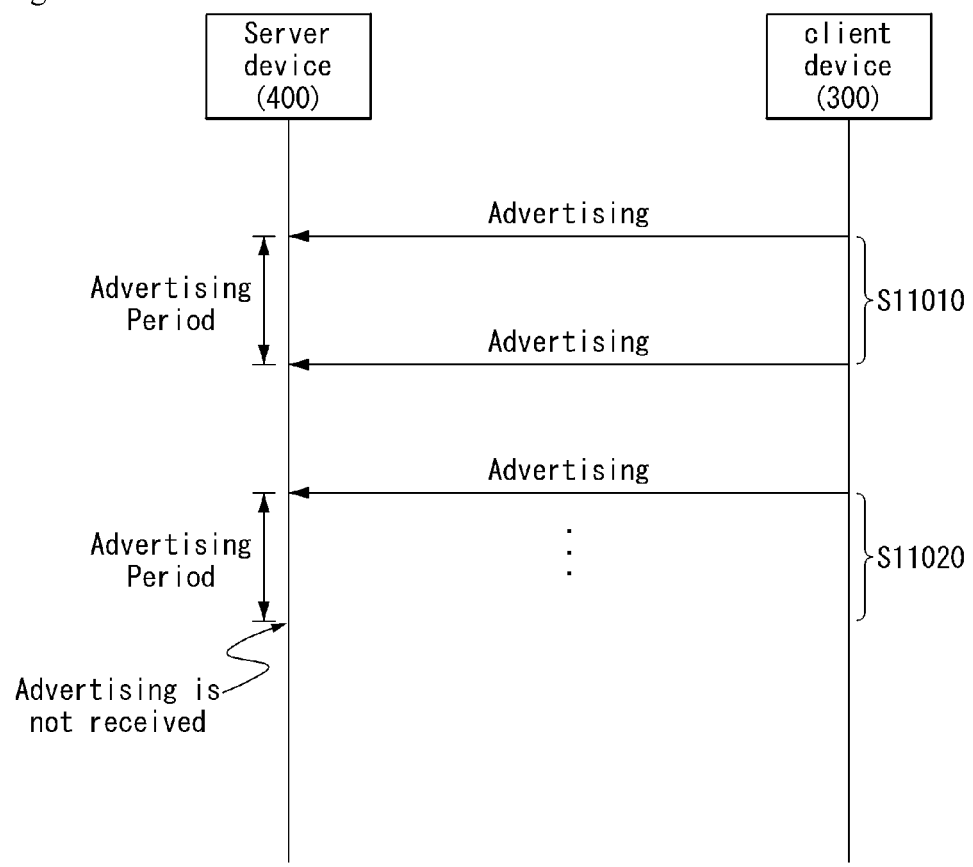
FIG. 11 is a flowchart illustrating an example of a method for checking a device status proposed in the present description.

FIG. 11 is a flowchart illustrating an example of a method for checking a device status proposed in the present description.

Referring to FIG. 11, the server device 400 may confirm status change of the client device 300 through an advertising message transmitted in a state in which the server device 400 is not connected to the client device 300 in Bluetooth LE.

Specifically, the client device 300 transmits an advertising message to the server device in every advertising period (S11010).

The advertising message may include service information representing a service which can be currently provided by the client device 300 and status information (first status information) representing the current status of the client device 300.

The server device 400 updates the status of the client device 300 on the basis of the advertising message transmitted in every advertising period.

However, when the advertising message is not received within the advertising period, the server device 400 determines that the status of the client device 300 is OFF and updates the status of the client device.

In addition, since the status of the client device 300 has changed from ON to OFF, the server device 400 may notify the user device 200 of the status change.

In the present embodiment, the advertising period may be set as a short period in order to rapidly detect the status of the client device 300.

Figure 12:
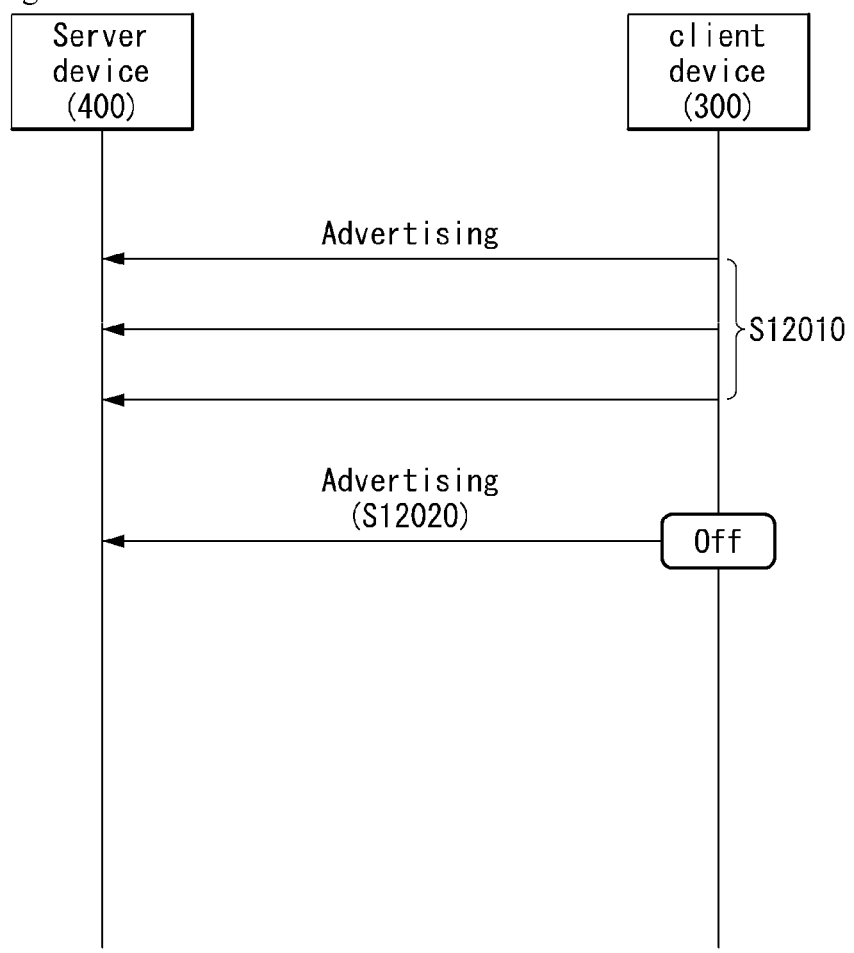
FIG. 12 is a flowchart illustrating another example of the method for checking a device status proposed in the present description.

FIG. 12 is a flowchart illustrating another example of the method for checking a device status proposed in the present description.

Referring to FIG. 12, the server device can detect an OFF status of the client device through an advertising message transmitted from the client device, distinguished from FIG. 11.

Specifically, the client device 300 may periodically transmit the advertising message to the server device 400 (S12010).

The advertising message may include service information representing a service which can be currently provided by the client device 300 and status information (first status information) representing the current status of the client device 300.

The server device 400 updates the status of the client device 300 on the basis of the periodically transmitted advertising message.

If the client device 300 is turned off, the client device 300 may transmit an advertising message including status information (second status information) representing the OFF status to the server device 400 immediately before being turned off (S12020).

Upon reception of the advertising message through step S12020, the server device 400 determines that the status of the client device 300 is OFF and updates the client status.

In addition, since the status of the client device 300 changes from ON to OFF, the server device 400 may notify the user device 200 of the status change.

Figure 13:
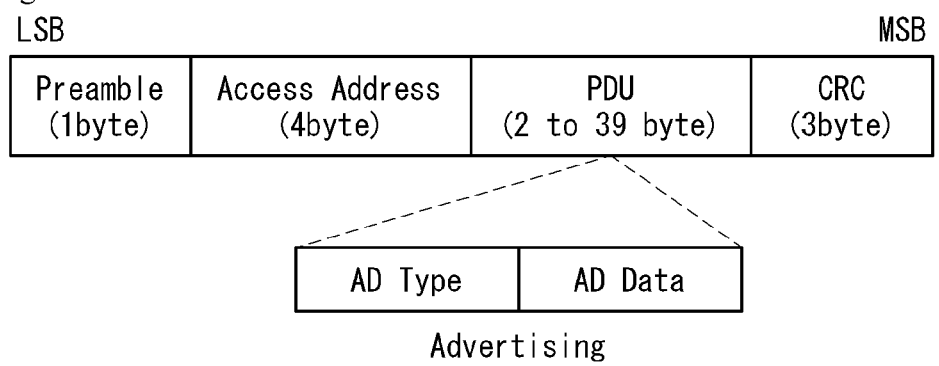
FIG. 13 shows an example of a message format for checking a device status proposed in the present description.

FIG. 13 shows an example of a message format for checking a device status proposed in the present description.

FIG. 13 shows an example of the format of the advertising message described in FIGS. 11 and 12. Referring to FIG. 13, the aforementioned status information and service information are included in AD data of a PDU field and AD Type represents which information is included in the AD data.

Table 2 shows an example of the AD Type and the AD data.

TABLE 2

| AD Type | AD Data |
|---|---|
| <<Status Information>> | On, Off, Booting, . . . |
| <<Service Information>> | Audio, Stored Content, . . . |
| <<OFF>> | Off |

Figure 14:
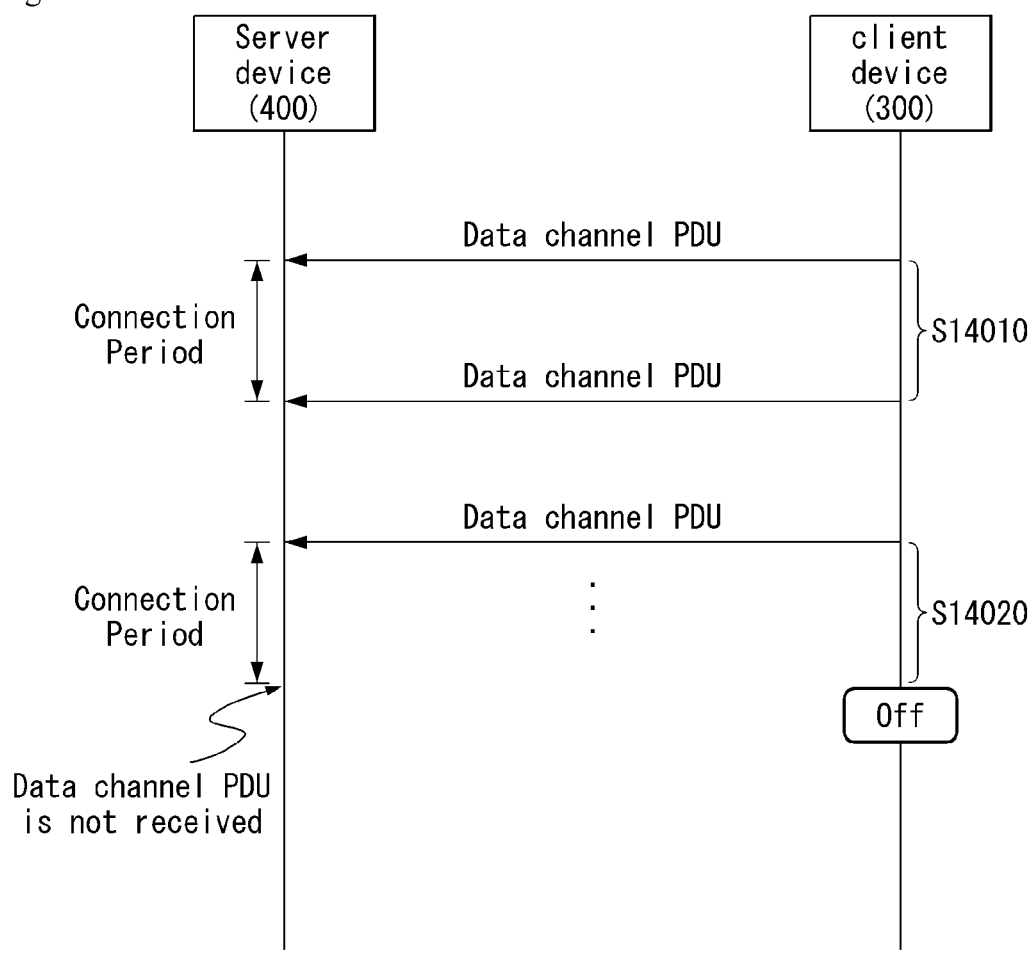
FIG. 14 is a flowchart illustrating another example of the method for checking a device status proposed in the present description.

FIG. 14 is a flowchart illustrating another example of the method for checking a device status proposed in the present description.

Referring to FIG. 14, the server device 400 may confirm status change of the client device 300 through a data channel PDU message transmitted and received in a state in which the server device 400 is connected to the client device 300 in Bluetooth LE.

Specifically, the client device 300 and the server device 400 can establish Bluetooth LE connection through the aforementioned Bluetooth LE connection procedure.

Then, the server device 400 may transmit/receive data to/from the client device 300 through the data channel PDU message.

Since the Bluetooth LE connection is released when no message is transmitted/received for a specific time, the server device 400 and the client device 300 can maintain the Bluetooth LE connection by periodically transmitting/receiving the data channel PDU message even though there is no data to be transmitted/received (S14010).

Here, the data channel PDU message may include the service information representing a service which can be currently provided by the client device 300 and the status information (first status information) representing the current status of the client device 300.

The server device 400 updates the status of the client device 300 on the basis of the data channel PDU message transmitted in a connection period.

However, when the data channel PDU message is not received within the connection period, the server device 400 determines that the status of the client device 300 is OFF and updates the client status.

In addition, since the status of the client device 300 changes from ON to OFF, the server device 400 may notify the user device 200 of the status change.

In the present embodiment, the connection period may be set to a short period in order to rapidly detect the status of the client device 300.

Figure 15:
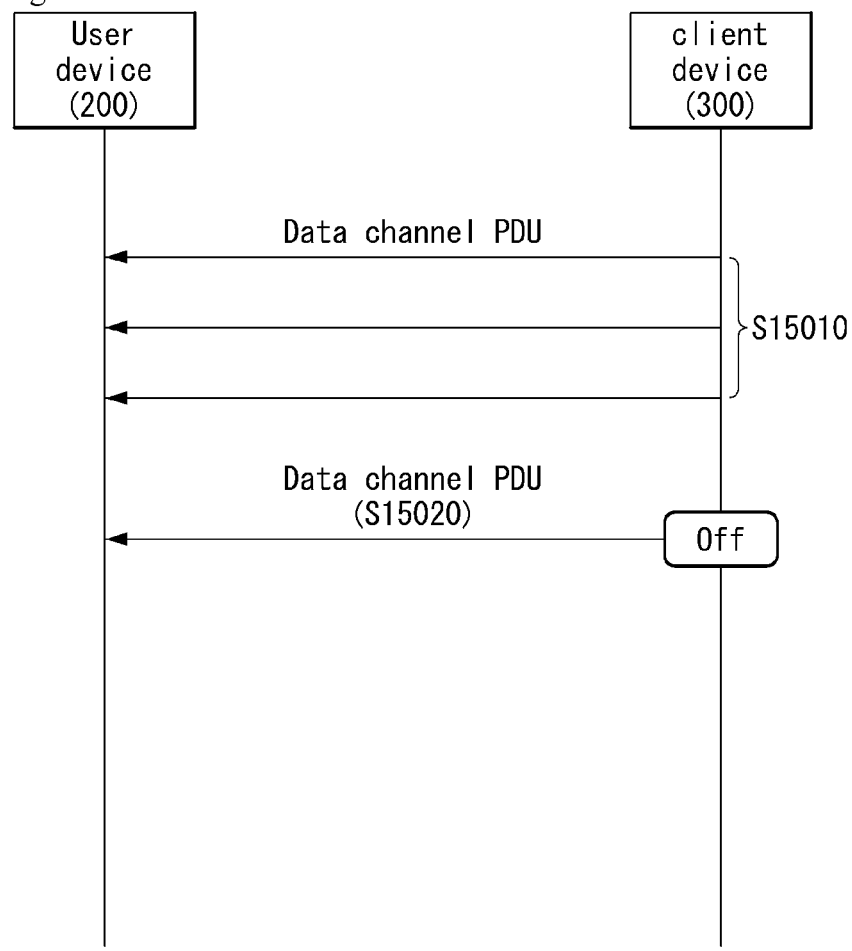
FIG. 15 is a flowchart illustrating another example of the method for checking a device status proposed in the present description.

FIG. 15 is a flowchart illustrating another example of the method for checking a device status proposed in the present description.

Referring to FIG. 15, the server device may detect an OFF status of the client device through the data channel PDU message transmitted from the client device, distinguished from FIG. 14.

Specifically, the client device 300 may periodically transmit/receive the data channel PDU message to/from the server device 300 in order to maintain Bluetooth LE connection therebetween even when there is no data to be transmitted/received as well as when there is data to be transmitted/received (S15010).

The data channel PDU message transmitted by the client device 300 may include the service information representing a service which can be currently provided by the client device 300 and the status information (first status information) representing the current status of the client device 300.

The server device 400 updates the status of the client device 300 on the basis of the periodically transmitted data channel PDU message.

If the client device 300 is turned off, the client device 300 may transmit the data channel PDU message including status information (second status information) representing the OFF status to the server device 400 immediately before being turned off (S15020).

Upon reception of the data channel PDU message through step S15020, the server device 400 determines that the status of the client device 300 is OFF and updates the client status.

In addition, since the status of the client device 300 changes from ON to OFF, the server device 400 may notify the user device 200 of the status change.

Figure 16:
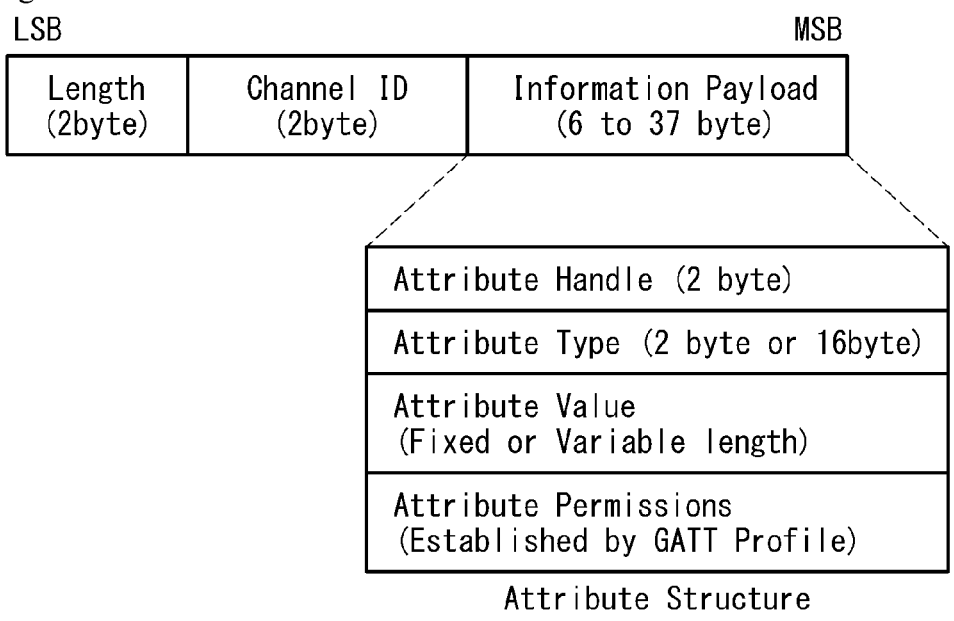
FIG. 16 shows another example of the message format for checking a device status proposed in the present description.

FIG. 16 shows another example of the message format for confirming a device status proposed in the present description.

FIG. 16 shows an example of the format of the data channel PDU message described in FIGS. 14 and 15. Referring to FIG. 16, the aforementioned status information and service information may be included in an Information Payload field.

When a Channel ID of the data channel PDU message is set to 0x0004, the format of the Information Payload field may be configured in Attribute Structure, as shown in FIG. 16, to represent that the message will be exchanged using Attribute Protocol.

Here, the status information and the service information may be included in Attribute Value, and Attribute Type may represent which information is included in the Attribute Value.

Figure 17:
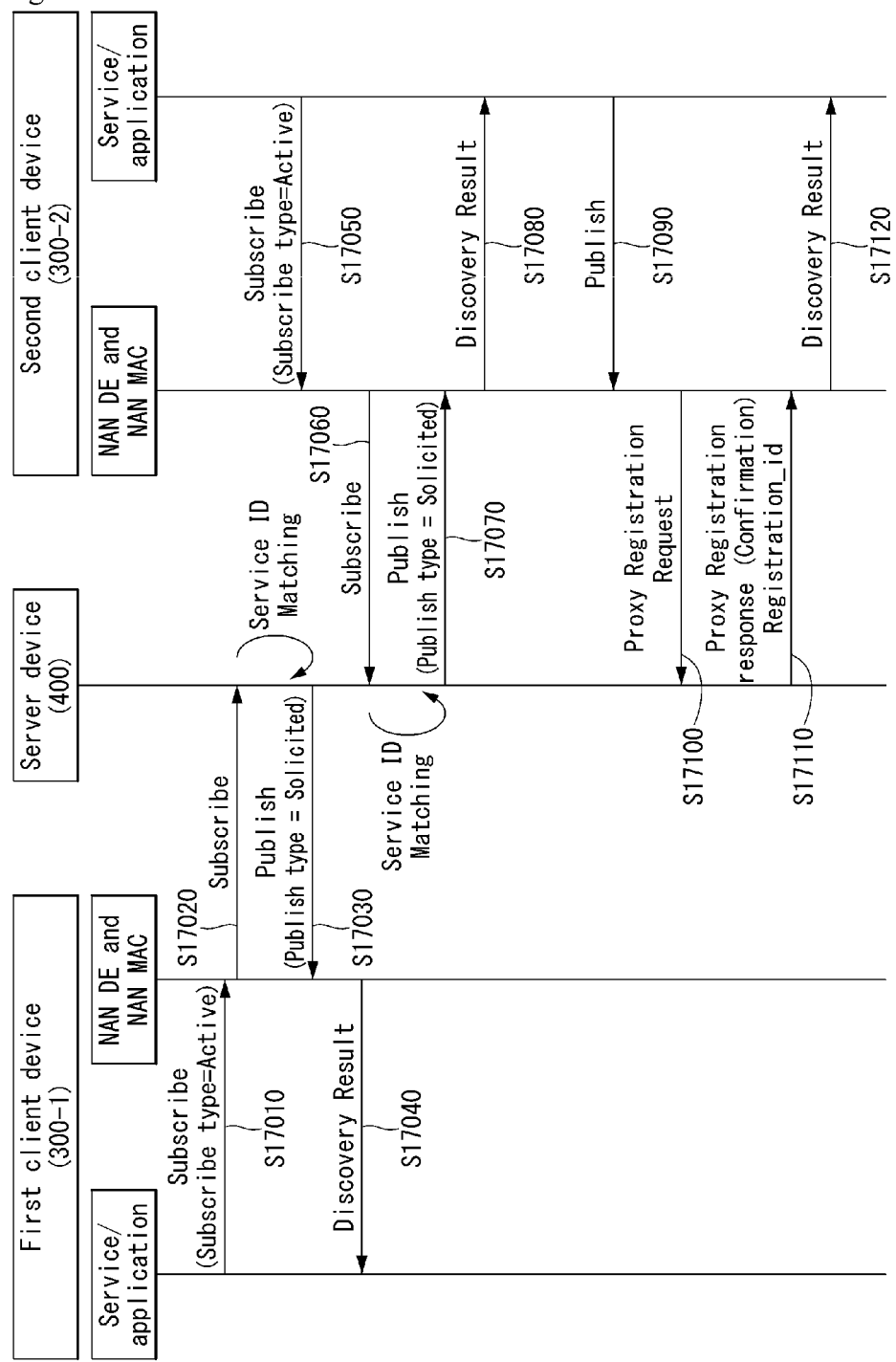
FIG. 17 is a flowchart illustrating an example of a method for discovering and registering a device proposed in the present description.

FIG. 17 is a flowchart illustrating an example of a method for discovering and registering a device proposed in the present description.

Referring to FIG. 17, in Wi-Fi neighbor awareness networking (NAN), a server device may discover a neighboring client device through a message transmitted from the neighboring client device and confirm a service that can be provided by the client device.

Specifically, the service/application of the first client device 300-1 delivers a subscribe message having a subscribe type of "Active" to a NAN DE and a NAN MAC (S17010).

The NAN DE and the NAN MAC transmit the subscribe message to the server device 400 (S17020), and the server device 400 may discover the first client device 300-1 through the received subscribe message and confirm a service that can be provided by the first client device 300-1.

Subsequently, the server device 400 performs service ID matching, sets a publish type to "Solicited" and transmits a publish message to the NAN DE and the NAN MAC of the first client device 300-1 (S17030).

The NAN DE and the NAN MAC transmit a discovery result to the service/application on the basis of the publish message (S17040).

Accordingly, the server device 400 can discover the first client device 300-1 and recognize the service that can be provided by the first client device 300-1. By means of the same procedure, the server device 400 can discover the second client device 300-2 and recognize a service that can be provided by the second client device 300-2.

In addition, the client devices 300-1 and 300-2 may check whether the server device provides a proxy service and be provided with the service.

That is, the client devices 300-1 and 300-2 transmit a subscribe message having a type of "Active" in order to discover the server device 400 which provides the proxy service, and the server device 400 which provides the proxy service responds to the subscribe message by transmitting a publish message having a type of "Solicit" when service ID matching is performed.

Specifically, the service/application of the second client device 300-2 delivers a subscribe message having a subscribe type of "Active" to the NAN DE and the NAN MAC (S17050).

The NAN DE and the NAN MAC transmit the subscribe message to the server device 400 (S17060), and the server device 400 may discover the first client device 300-1 through the received subscribe message and confirm the service that can be provided by the first client device 300-1.

Subsequently, the server device 400 performs service ID matching, sets the publish type to "Solicited" and transmits a publish message to the NAN DE and the NAN MAC of the first client device 300-1 (S17070).

The NAN DE and the NAN MAC transmit a discovery result to the service/application on the basis of the received publish message (S17080).

In addition, the first client device 300-1 and the second client device 300-2 may confirm a service that can be provided by the server device 400 through the publish message transmitted in step S17030 and S17070.

Thereafter, when the second client device 300-2 intends to register with the server device 400, the service/application of the second client device 300-2 transmits the publish message to the NAN DE and the NAN MAC (S17090), and the NAN DE and the NAN MAC transmit a proxy registration request message for requesting registration to the server device 400 (S170100).

Upon reception of the proxy registration request message, the server device 400 transmits a proxy registration response message indicating registration confirmation to the NAN DE and the NAN MAC of the second client device 300-2 when that server device 400 permits registration of the second client 300-2 (S170110).

Here, the proxy registration response message may include a registered id Registration_id.

Subsequently, the NAN DE and the NAN MAC of the second client device 300-2 transmit a discovery result which indicates a registration result to the service/application (S170120).

Through the above-described method, the server device can discover client devices and services which can be provided thereby in Wi-Fi NAN.

In the present invention, the proxy service (or NAN discovery proxy functionality) allows a client device to transmit the publish message and the subscribe message through a server device.

This service or functionality may be provided a discovery proxy component which is a stack included in the user device 200, the client devices 300-1 and 300-2 and the server device 400.

Figure 18:
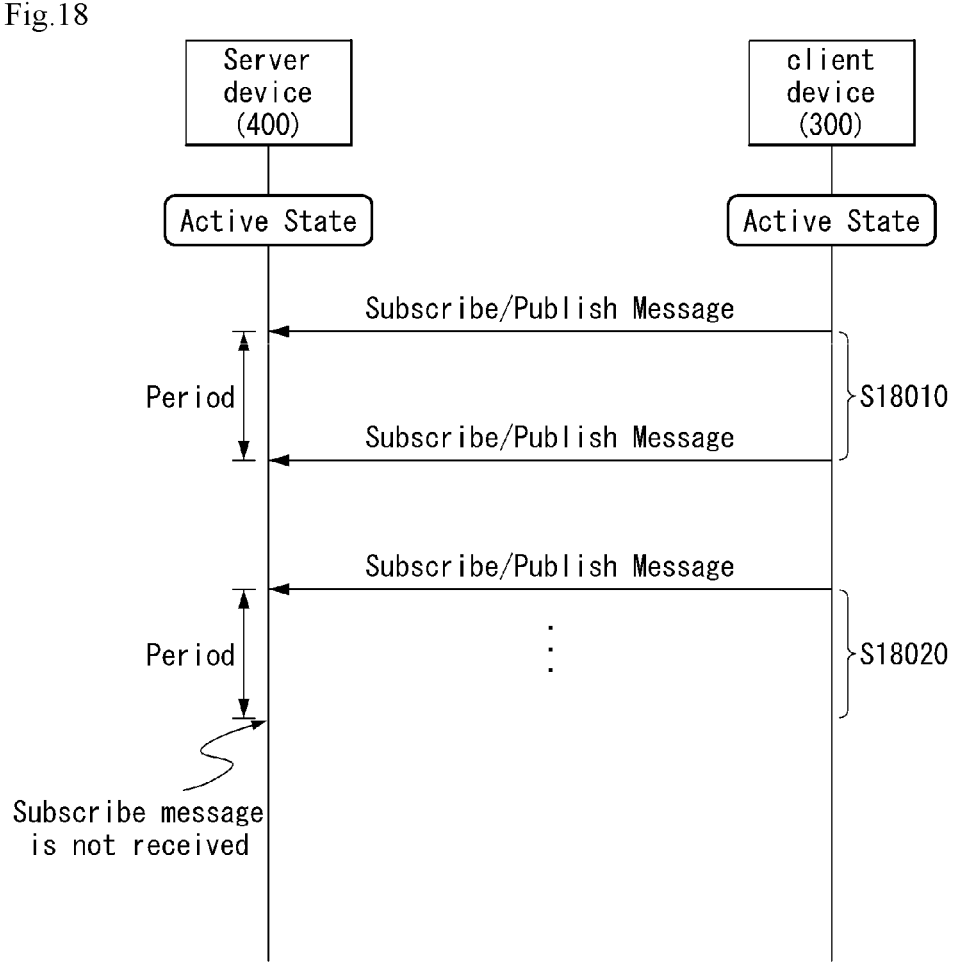
FIG. 18 is a flowchart illustrating another example of the method for checking a device status proposed in the present description.

FIG. 18 is a flowchart illustrating another example of the method for checking a device status proposed in the present description.

Referring to FIG. 18, in Wi-Fi NAN, the server device 400 may check status change of the client device 300 by transmitting/receiving the subscribe message and the publish message to/from the client device 300.

Specifically, the client device 300 and the server device 400 may periodically transmit/receive the subscribe message/publish message in an active state (S18010).

Here, the subscribe message or the publish message transmitted from the client device 300 to the server device 400 may include the service information representing the service that can be currently provided by the client device 300 and the status information (first status information) representing the current status of the client device 300.

The server device 400 updates the status of the client device 300 on the basis of the data channel PDU message transmitted in a specific period.

However, when the subscribe message or the publish message is not received within the specific period, the server device 400 determines that the status of the client device 300 is OFF and updates the client status.

In addition, since the status of the client device 300 changes from ON to OFF, the server device 400 may notify the user device 200 of the status change.

In the present embodiment, the specific period may be set to a short period in order to rapidly detect the status of the client device 300.

Figure 19:
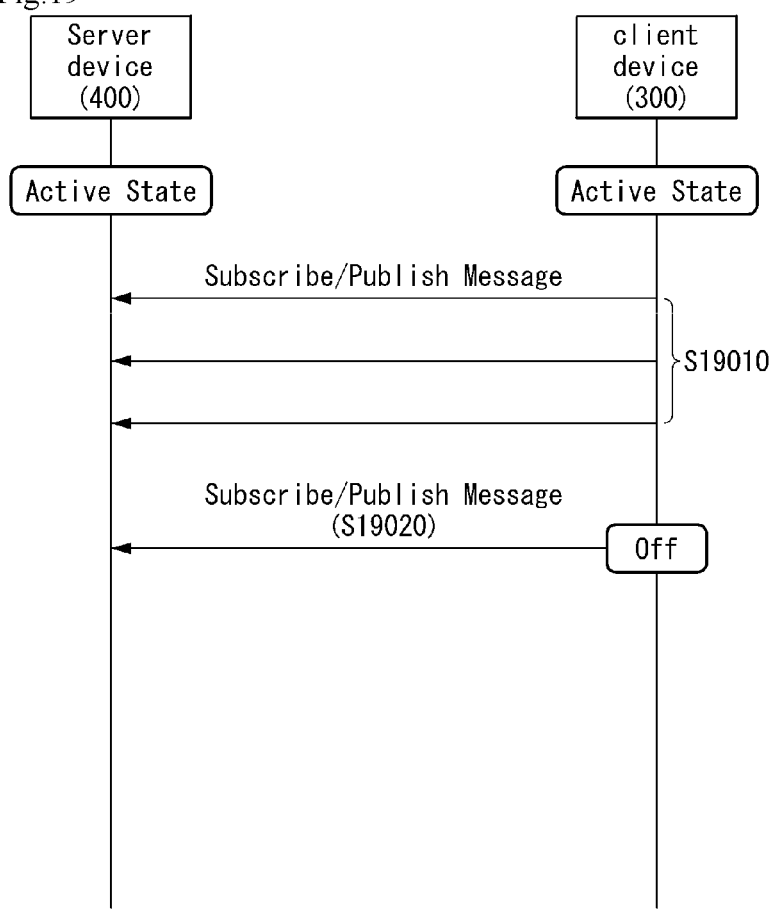
FIG. 19 is a flowchart illustrating another example of the method for checking a device status proposed in the present description.

FIG. 19 is a flowchart illustrating another example of the method for checking a device status proposed in the present description.

Referring to FIG. 19, the server device may detect an OFF status of the client device through the subscribe message or the publish message transmitted from the client device, distinguished from FIG. 18.

Specifically, the client device 300 may periodically transmit/receive the subscribe message or the publish message to/from the server device 300 in the active state (S19010).

The subscribe message or the publish message transmitted by the client device 300 may include the service information representing a service which can be currently provided by the client device 300 and the status information (first status information) representing the current status of the client device 300.

The server device 400 updates the status of the client device 300 on the basis of the periodically transmitted subscribe message or publish message.

If the client device 300 is turned off, the client device 300 may transmit the subscribe message or the publish message including status information (second status information) representing the OFF status to the server device 400 immediately before being turned off (S19020).

Upon reception of the subscribe message or the publish message through step S19020, the server device 400 determines that the status of the client device 300 is OFF and updates the client status.

In addition, since the status of the client device 300 changes from ON to OFF, the server device 400 may notify the user device 200 of the status change.

According to the above-described method, when the status of the client device changes, the server device can confirm the status change and notify the user device of the status change in real time in Wi-Fi NAN.

Figure 20:
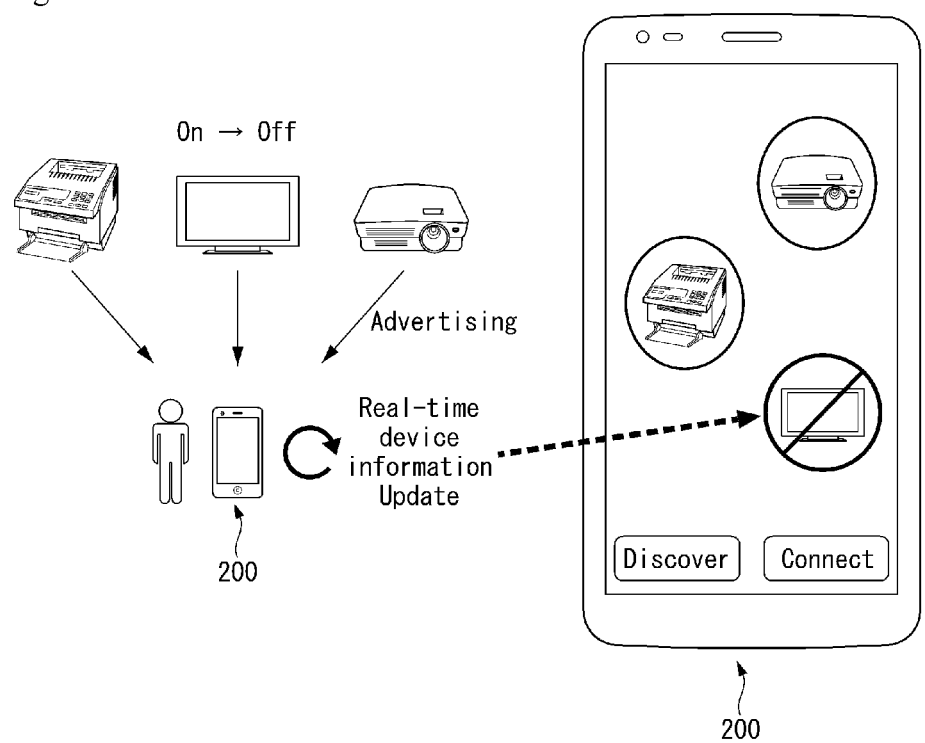
FIG. 20 shows an example of a user interface (UI) when a device status is changed proposed in the present description.

FIG. 20 shows an example of a user interface (UI) when a device status changes proposed in the present description.

Referring to FIG. 20, upon determining that the status of the client device 300 is OFF through the above-described method, the user device 200 may display the device in the OFF status through the UI.

That is, when the server device 400 does not receive a message periodically transmitted from the client device 300 or receives a message indicating that the current status of the client device 300 is OFF from the client device 300, the server device 400 can update the status of the client device 300 to OFF and notify the user device 200 of the OFF status of the client device 300.

Alternatively, in a case in which the user device 200 directly receives a message from the client device 300, the user device 200 can be aware of an OFF status of the client device 300 when the user device 200 does not receive a message periodically transmitted from the client device 300 or receives a message indicating that the current status of the client device 300 is OFF.

Upon determining that the status of the client device 300 is OFF, the user device 200 can display the OFF status of the client device 300 on the UI.

FIG. 21 is a flowchart illustrating an example of a method for changing parameters of a device proposed in the present description.

Referring to FIG. 21, in Bluetooth LE, the user device may change client parameters through the aforementioned user confirmation procedure and a client device may operate in a mode changed according to the changed parameters.

Specifically, the client devices 300-1 and 300-2 and the server device 400 operate in the default user mode until the server device 400 recognizes the user device 200 through the aforementioned user confirmation procedure.

In the default user mode, the server device 400 performs communication with the client devices 300-1 and 300-2 except the user device 200.

In this case, data insensitive to latency is exchanged through communication, and the above-described service information and status information may be included in such data.

In the default user mode, a parameter representing the advertising period for transmitting the advertising message and a parameter representing the connection period for transmitting the data channel PDU message are set to states optimized to transmit/receive data insensitive to latency.

Accordingly, the current statuses of the client devices 300-1 and 300-2 may not correspond to the statuses of the client devices 300-1 and 300-2 which are recognized by the server device 400.

The server device 400 may recognize the user device 200 through the aforementioned user confirmation procedure (S21010).

Here, the user confirmation procedure can check whether the user device 200 is a device stored in a list of the server device 400 through a Bluetooth authentication procedure and a proxy service registration procedure.

The proxy service may refer to a service which provides communication of the user device 200 with the client devices 300-1 and 300-2 through the server device 400, as described above. For example, the proxy service may refer to a service through which the user device 200 discovers a neighboring client device by means of the server device 400 and performs communication with the discovered client device through the server device 400.

Upon completion of the user confirmation procedure, the server device 400 may transmit a write request message for requesting indication of change of parameters to predetermined values and writing of parameter values to be changed (e.g., parameter values related to an advertising operation and a connection operation) to the client devices 300-1 and 300-2 (S21040).

Here, advertising parameters related to the advertising operation may include Advertising_Interval_Min, Advertising_Interval_Max, Advertising_Type, Tx_Power, and the like, and connection parameters related to the connection operation may include transmitWindowSize, transmitWindowOffset, conninterval, connSlaveLatency, connSupervisionTimeout, and the like.

In addition, the server device 400 may change the parameters and indicate entry into the enable user mode through the write request message.

Upon reception of the write request message, the client devices 300-1 and 300-2 may change parameters to parameter values transmitted thereto and transmit a write response message to the server device 400 (S21050).

Here, the write response message may include information indicating a parameter change result.

Subsequently, the client devices 300-1 and 300-2 and the server device 400 enter the enable user mode and operate according to the changed parameters.

For example, when a parameter indicating a transmission period of the advertising message or the data channel PDU message is changed to a value indicating a short transmission period, the client devices 300-1 and 300-2 and the server device 400 can transmit the advertising message or the data channel PDU message in the short period to provide information to the user device 200 without delay.

As another embodiment of the present invention, the server device 400 may receive a write request message for requesting indication of change of parameters and writing of parameter values to be changed (e.g., parameter values related to an advertising operation and a connection operation) from the user device 200 (S21020) and transmit a write response message in response to the write request message (S21030).

In this case, steps S21040 and S21050 may be performed through parameters transmitted from the user device 200 instead of predetermined parameters.

FIG. 22 shows an example of GATT characteristics proposed in the present description.

Referring to FIG. 22, a user device may instruct a server device to perform a specific operation or acquire information from the server device using characteristics of the server device, and the server device may instruct a client device to perform a specific operation or acquire information from the client device using characteristics of the client device.

Specifically, a proxy server device, a proxy client device and a user device are definitions of devices at the profile level in the present invention.

The user device is a device carried by a user and, for example, is a phone, a wearable device or the like.

The user device has characteristics that mobility is high because the user carries the device and the user device can instruct neighboring devices according to an input value of the user.

In addition, the user device can directly acquire status information and service information from proxy client devices or obtain information about a plurality of neighboring devices from proxy server devices.

The user device can store information about proxy server devices in a list and perform the user confirmation procedure when a proxy server device stored in the list is located near the user device.

The proxy server device stores neighboring proxy client devices and user devices in a list through a proxy service registration procedure.

In addition, the proxy server device can receive status information and service information from proxy client devices, store the received information, transmit stored information to a user device, and transmit the connection parameter and the advertising parameter preset through a parameter change procedure or received from the user device to a client device to change operations of a proxy device.

Proxy client devices can store proxy server devices in lists through the proxy service registration procedure and transmit status information and service information thereof to proxy server devices or user devices.

The user device, the proxy server device and the proxy client device can use the advertising message or the data channel PDU message when performing communication therebetween, and information transmitted/received through the advertising message or the data channel PDU message can be stored in the form of characteristics of the GATT database, as shown in FIG. 22.

FIG. 23 is a flowchart illustrating an example of a method for transmitting/receiving a message between devices proposed in the present description.

Referring to FIG. 23, in Wi-Fi NAN, the user device may change client parameters through the aforementioned user confirmation procedure, and a client device may change modes and operate in the changed mode according to the changed parameters.

Step S23010 is the same as step S21020 of FIG. 21 and thus description thereof is omitted.

After step S23020, the server device 400 may exchange the subscribe message or the publish message with the client devices 300-1 and 300-2 in order to change parameters of the client devices 300-1 and 300-2 to preset values (S23040).

Then, the client devices 300-1 and 300-2 and the server device 400 enter the enable user mode and operate according to the changed parameters.

In another embodiment of the present invention, the server device 400 may receive a proxy registration request message including parameter values to be changed from the user device 200 (S23020) and transmit a proxy registration response message in response to the proxy registration request message (S23030).

In this case, step S23040 can be executed through parameters transmitted from the user device 200 instead of preset parameters.

FIG. 24 shows an example of a message format transmitted/received in Wi-Fi NAN proposed in the present description.

FIG. 24 shows an example of the format of the aforementioned messages transmitted in Wi-Fi NAN (e.g., subscribe message, publish message, proxy registration request message, proxy registration response message, etc.).

As shown in FIG. 24, a NAN IE field can be composed of Attribute ID, Length and Attribute Body Field.

The Attribute ID indicates data included in a message and the Attribute Body Field includes actual data.

Table 3 shows examples of the Attribute ID.

TABLE 3

| Attribute ID | Description |
| --- | --- |
| 0 | Master Indication Attribute |
| 1 | Cluster Attribute |
| 2 | Service ID List Attribute |
| 3 | Service Descriptor Attribute |
| 4 | NAN Connection Capability Attribute |
| 5 | WLAN Infrastructure Attribute |
| 6 | P2P Operation Attribute |
| ... | ... |
| 13 | Cluster Discovery Attribute |
| 14-220 | Reserved |
| 221 | Vendor Specific Attribute |
| 222-255 | Reserved |

Parameters defined in the present description may be defined using Attribute IDs as shown in Table 4 or may be included as the Attribute Body Field in a specific Attribute ID as shown in Table 5.

Table 4 shows examples of Attribute IDs of the parameters defined in the present invention.

TABLE 4

| Attribute ID | Description |
| --- | --- |
| 14 | Status Information Attribute |
| 15 | Service Information Attribute |
| 16 | Registered Device Attribute |
| 17 | Connection Parameter Attribute |
| 18 | Advertising Parameter Attribute |
| 19 | Group Parameter Change Attribute |
| 20 | Parameter Change Attribute |
| 21 | Scheduling Information Attribute |
| 22 | Data Path Information Attribute |
| 23 | Service Discovery Proxy Attribute |
| ... | ... |

Table 5 shows an example of the Attribute Body Field including the parameters defined in the present invention.

TABLE 5

| Field |
| --- |
| Status Information |
| Service Information |
| Registered Device |
| Connection Parameter |
| Advertising Parameter |
| Group Parameter Change |
| Parameter Change |
| Scheduling Information |
| Data Path Information |
| Service Discovery Proxy Information |
| . . . |

In Tables 4 and 5, Data Path Information Attribute indicates whether data is exchanged between NAN devices.

Figure 25:
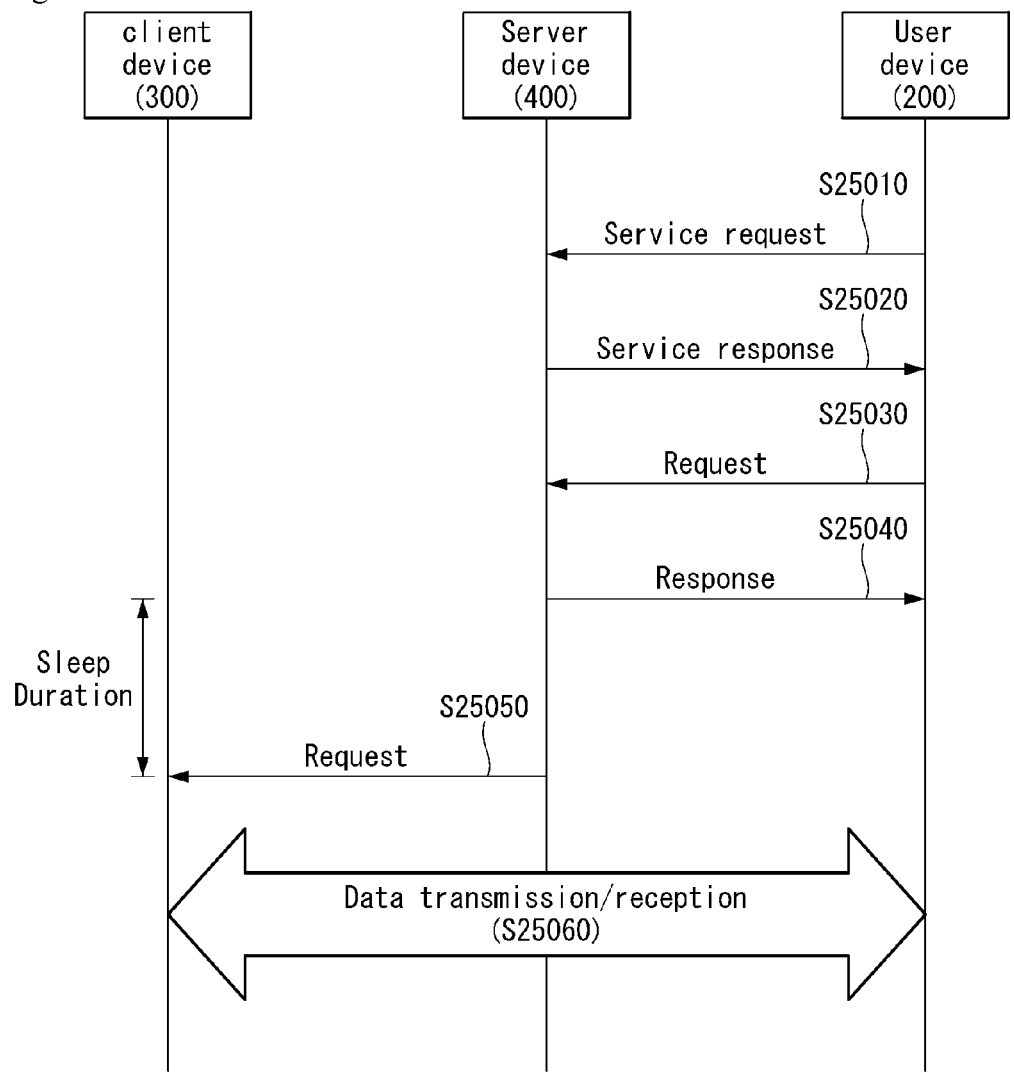
FIG. 25 is a flowchart illustrating an example of a method for transmitting/receiving a message between devices proposed in the present description.

FIG. 25 is flowchart illustrating an example of a method for transmitting/receiving a message between devices proposed in the present description.

Referring to FIG. 25, upon reception of a request for data transmission/reception to/from a client device from the user device, the server device may transmit information for data transmission/reception to the user device and the client device such that the user device and the client device can perform data transmission/reception therebetween.

Specifically, the user device 200 transmits a service request message to the server device 400 to be provided with the proxy service (S25010).

The server device 400 transmits a service response message indicating that the user device 200 is permitted to use the proxy service if the user device 200 is a device which can use the proxy service and transmits a service response message indicating that the user device 200 is not permitted to use the proxy service if not (S25020).

Upon reception of the service response message indicating that the user device 200 is permitted to use the proxy service, the user device 200 can be provided with the proxy service and transmit/receive messages to/from the client device 300 through the proxy service.

However, the client device 300 mostly in a sleep mode for low-power operation and can be activated at a set time to transmit/receive messages, and thus the user device 200 cannot transmit/receive messages to/from the client device 300 all the time.

Furthermore, since the server device 400 knows the time at which the client device 300 is activated but the user device 200 does not know the time, it is difficult for the user device 200 to directly communicate with the client device 300 without the server device 400.

Accordingly, the user device 200 transmits a request message for requesting communication with the client device 300 to the server device 400 when the user device 200 intends to communicate with the client device 300 (S25030).

Upon reception of the request message, the server device 400 transmits a response message including scheduling information (first scheduling information) for communication with the client device 300 to the user device 200 in response to the request message (S25040).

The scheduling information is information used for the user device 200 to perform communication with the client device 300 and may include information as shown in Table 6.

Table 6 shows an example of information that can be included in the scheduling information.

TABLE 6

| Scheduling Information | Description |
| --- | --- |
| Channel map | Status information of all channels |
| Channel Class | Channel position recommended by a proxy server |
| Connection Parameters | Setting values related to connection state, such as transmitWindowSize, transmitWindowOffset, connInterval, connSlaveLatency, connSupervisionTimeout, etc. |
| Time Stamp | Information on time recommended for communication between a user device and a proxy client device |

In addition, the scheduling information may include information for establishing connection between the user device 200 and the client device 300 through wireless communication technology (e.g., Bluetooth, Wi-Fi, or the like) as well as the information shown in Table 6.

Subsequently, the server device 400 transmits a request message for requesting communication with the user device 200 to the client device 300 after the time at which the client device 300 is activated, that is, after the sleep duration (S25050).

Here, the request message includes scheduling information (second scheduling information) including the same information as the first scheduling information.

Subsequently, the user device 200 and the client device 300 may perform communication therebetween to transmit/receive data. Here, the user device 200 and the client device 300 can perform communication on the basis of the scheduling information and may perform communication without using the scheduling information (S25060).

That is, the scheduling information is information provided by the server device 400 and used for the user device 200 and the client device 300 to efficiently perform communication, and the user device 200 and the client device 300 need not necessarily perform communication on the basis of the scheduling information.

The user device and the client device can acquire information for performing communication from the server device through the above-described method and thus can efficiently perform communication.

In the present embodiment, when the server device 400, the user device 200 and the client device 300 perform communication through Wi-Fi NAN, the request message and the response message may be the publish message or the subscribe message.

Furthermore, although the drawings have been individually described for ease of description, the embodiments shown in the drawings may be combined with each other to implement new embodiments. As necessary, designing recording media readably by a computer recording programs to execute the above-described embodiments is also within the scope of the present invention.

The direction based device discovery method of the present description is not limited to the configurations and methods of the aforementioned embodiments, and some or all of the embodiments may be selectively combined such that the embodiments can be modified in various manners.

The direction based device discovery method of the present description may be implemented as processor-readable code in a recording medium that can be read by a processor provided in a network device. The processor-readable recording medium may include all kinds of recording devices capable of storing data readable by a processor. Examples of the processor-readable recording medium may include a ROM, a RAM, a CD-ROM, magnetic tapes, floppy disks, optical data storage devices, and the like and also include carrier-wave type implementation such as transmission over the Internet. Furthermore, the processor-readable recording media may be distributed to computer systems connected with each other via a network, and processor readable code may be stored and executed in a distributed manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

Both apparatus and method inventions are mentioned in this specification and descriptions of both the apparatus and method inventions may be complementarily applied to each other.

INDUSTRIAL APPLICABILITY

The present description relates to data transmission and reception in a wireless communication system and, particularly, to a method and device for transmitting/receiving data among a server device, a user device and a client device.

The invention claimed is:

1. A method for transmitting/receiving, by a server device, data with a client device in a wireless communication system, the method comprising:
    registering the client device by storing device information indicating the client device in a list;
    receiving, from the client device, first status information, wherein the first status information is used for updating a status of the client device in a user device, and
    wherein the first status information is transmitted without connection between the server device and the client device; and
    transmitting, to the user device, second status information indicating the updated status of the client device,
    wherein a transmission period of the first status information and the second status information is varied based on whether a User Confirm procedure is processed,
    wherein the User Confirm procedure is for authenticating that the server device and the user device are close to each other and for performing permission checks on the server device side that the user device is a device that can issue commands to the server device,
    wherein the transmission period of the first status information and the second status information is shorter after the User Confirm procedure is processed, and
    wherein the user device checks the status change of the client device through the server device without continuously discovering the client device at each occurrence of the status change of the client device.

2. The method according to claim 1, wherein the first status information indicates a changed status of the client device when the status of the client device changes.

3. The method according to claim 1, further comprising:
    updating the status of the client device based on the first status information,
    wherein the first status information indicates the current status of the client device when the first status information is received by the sever device within a specific time duration.

4. The method according to claim 1, wherein the status of the client device is updated as OFF when the first status information is not received by the server device within a specific time duration.

5. The method according to claim 1, further comprising:
    transmitting, to the client device, a parameter indicating a transmission period of the first status information indicating the current status of the client device.

6. The method according to claim 5, further comprising:
    receiving, from the user device, a request message for requesting change of the parameter indicating the transmission period of the first status information; and
    transmitting a response message in response to the request message to the user device,
    wherein the request message includes the parameter.

7. The method according to claim 1, wherein the first status information indicates one of ON, Booting and OFF of the client device.

8. The method according to claim 1, further comprising:
    receiving, from the user device, a request message for requesting data transmission/reception with the client device; and
    transmitting, to the user device, a response message including first scheduling information for data transmission/reception with the client device.

9. The method according to claim 8, further comprising:
    transmitting second scheduling information for data transmission/reception with the user device to the client device.

10. The method according to claim 9, wherein each of the first scheduling information and the second scheduling information includes at least one of channel position information of a channel for transmitting/receiving data with the client device, a channel ID indicating the channel, channel state information indicating a state of the channel, connection parameter information related to connection between the user device and the client device, or time information for data transmission/reception between the user device and the client device.

11. A method for transmitting/receiving, by a user device, data to/from a client device in a wireless communication system, the method comprising:
    receiving status information indicating a status of the client device from a server device,
    wherein the status information indicating one of ON, Booting and OFF of the client device,
    wherein the status information is transmitted without connection between the server device and the client device,
    wherein a transmission period of the status information is varied based on whether a User Confirm procedure is processed,
    wherein the User Confirm procedure is for authenticating that the server device and the user device are close to each other and for performing permission checks on the server device side that the user device is a device that can issue commands to the server device,
    wherein the transmission period of the status information is shorter after the User Confirm procedure is processed, and
    wherein the user device checks the status change of the client device through the server device without continuously discovering the client device at each occurrence of the status change of the client device; and
    transmitting, to the server device, a request message for requesting data transmission/reception with the client device when the status information indicates ON;

receiving, from the server device, a response message including scheduling information for data transmission/reception with the client device; and transmitting/receiving data with the client device based on the scheduling information.

12. The method according to claim 11, wherein the scheduling information includes at least one of channel position information of a channel for transmitting/receiving data with the client device, a channel ID indicating the channel, channel state information indicating a state of the channel, connection parameter information related to connection between the user device and the client device, or time information for data transmission/reception between the user device and the client device.

13. A server device for transmitting/receiving data with a client device in a wireless communication system, the server device comprising:

a transceiver configured to communicate with the outside in a wireless or wired manner; and a processor functionally connected to the transceiver, wherein the processor controls to:

register the client device by storing device information indicating the client device in a list, receive, from the client device, first status information, wherein the first status information is used for updating a status of the client device in a user device, and wherein the first status information from the client device is transmitted without connection between the server device and the client device, and transmit, to the user device, second status information indicating the updated status of the client device, wherein a transmission period of the first status information and the second status information is varied based on whether a User Confirm procedure is processed, wherein the User Confirm procedure is for authenticating that the server device and the user device are close to each other and for performing permission checks on the server device side that the user device is a device that can issue commands to the server device, wherein the transmission period of the first status information and the second status information is shorter after the User Confirm procedure is processed, and wherein the user device checks the status change of the client device through the server device without continuously discovering the client device at each occurrence of the status change of the client device.

* * * * *